United States Patent
Abramov et al.

(10) Patent No.: US 12,351,303 B2
(45) Date of Patent: Jul. 8, 2025

(54) SYSTEM AND METHOD FOR OPERATING AIR VEHICLE

(71) Applicant: Israel Aerospace Industries Ltd., Lod (IL)

(72) Inventors: Danny Abramov, Lod (IL); Shai Alexandroni, Lod (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 18/722,145

(22) PCT Filed: Dec. 22, 2022

(86) PCT No.: PCT/IL2022/051373
§ 371 (c)(1),
(2) Date: Jun. 20, 2024

(87) PCT Pub. No.: WO2023/126919
PCT Pub. Date: Jul. 6, 2023

(65) Prior Publication Data
US 2025/0083806 A1    Mar. 13, 2025

(30) Foreign Application Priority Data
Dec. 28, 2021 (IL) .......................................... 289487

(51) Int. Cl.
*B64C 27/26* (2006.01)
*B64C 29/00* (2006.01)
*B64U 10/25* (2023.01)

(52) U.S. Cl.
CPC .......... *B64C 29/0025* (2013.01); *B64C 27/26* (2013.01); *B64U 10/25* (2023.01)

(58) Field of Classification Search
CPC ..... B64C 29/0025; B64C 27/26; B64U 10/25; B64U 50/13
See application file for complete search history.

(56) References Cited

U.S. PATENT DOCUMENTS

| 6,892,979 B2 * | 5/2005 | Milde, Jr. ............... B64C 27/20 244/12.3 |
| 7,992,827 B2 | 8/2011 | Shepshelovich |

(Continued)

FOREIGN PATENT DOCUMENTS

| CN | 106741820 A | 5/2017 |
| CN | 107697268 B | 6/2023 |

(Continued)

OTHER PUBLICATIONS

Nagel, et al., "The Concept of High-Lift, Mild Stall Wing", 24th International Congress of the aeronautical Sciences ICAS 2004, Aug. 29, 2004, 10 pages.

*Primary Examiner* — Brian M O'Hara
(74) *Attorney, Agent, or Firm* — Dorsey & Whitney LLP

(57) ABSTRACT

A VTOL-type air vehicle is transitioned from forward speed mode to hover mode via a transient path in transition mode. The air vehicle includes first and second propulsion systems, and high lift, mild stall fixed wings. The first propulsion system can provide a first thrust (sufficient for enabling powered aerodynamic flight) at a first thrust vector. The second propulsion system can provide a second thrust (sufficient for enabling vectored thrust flight) at a second thrust vector, which is spatially fixed with respect to the air vehicle at least during transitioning. The transient path includes, during transitioning, manipulating a first magnitude of angle of attack and a second magnitude of forward speed to provide a corresponding aerodynamic lift component, and concurrently manipulating a third magnitude of the second thrust to provide a vertical vectored thrust component corresponding to the first magnitude of angle of attack. A summation of the aerodynamic lift component and vertical vectored thrust component is sufficient for enabling the air vehicle to remain in controlled flight in transition mode.

22 Claims, 21 Drawing Sheets

(56) References Cited

U.S. PATENT DOCUMENTS

| | | | |
|---|---|---|---|
| 8,109,473 | B2 | 2/2012 | Shepshelovich et al. |
| 9,120,560 | B1 | 9/2015 | Armer et al. |
| 9,731,818 | B2 | 8/2017 | Dekel et al. |
| 10,162,367 | B2 | 12/2018 | Douglas et al. |
| 10,279,907 | B2 | 5/2019 | Shepshelovich et al. |
| 10,423,168 | B2 | 9/2019 | Shepshelovich et al. |
| 10,676,176 | B1 | 6/2020 | Piedmonte et al. |
| 12,162,596 | B2 * | 12/2024 | Andrews ............... G05D 1/0858 |
| 2011/0163205 | A1 | 7/2011 | Shepshelovich et al. |
| 2016/0046369 | A1 | 2/2016 | Watkins |
| 2016/0236774 | A1 | 8/2016 | Niedzballa |
| 2019/0061964 | A1 | 2/2019 | Murrow |
| 2019/0382104 | A1 * | 12/2019 | Low ......................... B64C 27/22 |
| 2020/0164972 | A1 | 5/2020 | Kiesewetter et al. |
| 2021/0197965 | A1 | 7/2021 | Kunz et al. |
| 2022/0009626 | A1 | 1/2022 | Baharav et al. |
| 2024/0116646 | A1 * | 4/2024 | Kobayashi ............. B64D 27/35 |
| 2025/0074582 | A1 * | 3/2025 | Zhou ....................... B64C 27/26 |

FOREIGN PATENT DOCUMENTS

| | | | |
|---|---|---|---|
| IL | 230703 | A0 | 6/2014 |
| IL | 226119 | A | 10/2016 |
| WO | 2016055990 | A1 | 4/2016 |
| WO | 2020105045 | A1 | 5/2020 |
| WO | 2020185947 | A1 | 9/2020 |

\* cited by examiner

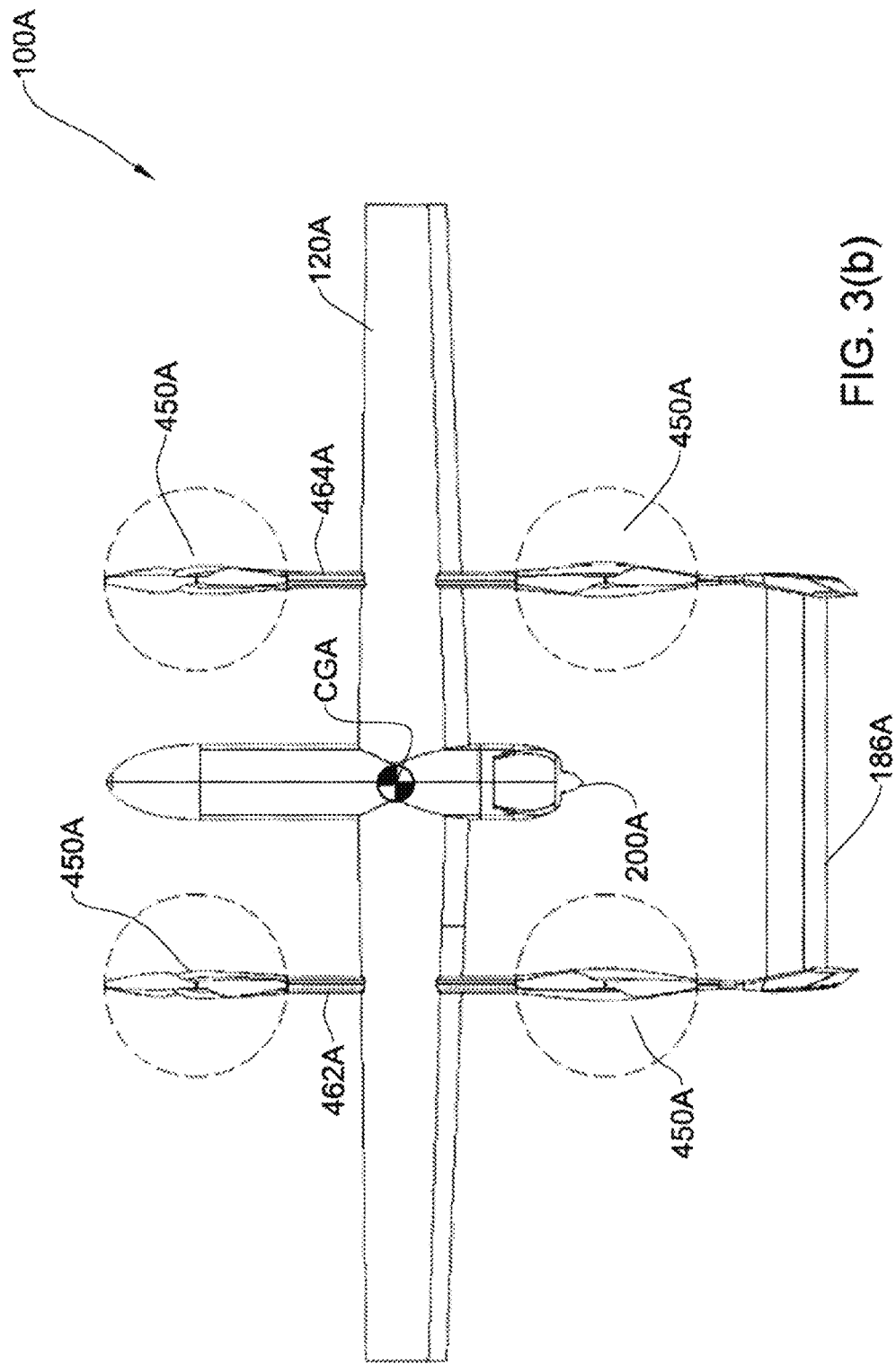

SYSTEM AND METHOD FOR OPERATING AIR VEHICLE

TECHNOLOGICAL FIELD

The presently disclosed subject matter relates to methods of operating air vehicles and to air vehicles thus operated, in particular to methods of operating at least some types of VTOL air vehicles and to such VTOL air vehicles thus operated.

BACKGROUND

VTOL fixed wing type air vehicles require significant energy for vertical take-off, controlled vertical landing or decelerating from aerodynamic powered flight to hover. In cases where electrical motors are used as propulsion units for providing vectored flight, electrical batteries for such maneuvers can be required to provide large amounts of electrical power over relatively large time periods, which in turn can constitute a significant weight contribution to the air vehicle.

Some VTOL fixed wing type air vehicles use swivel type propulsion units to transit between aerodynamic powered flight and zero forward speed. For example, by way of non-limiting example, U.S. Pat. No. 10,279,907, assigned to the present assignee, provides methods for operating an air vehicle having fixed wings. Such methods include the step of providing an operating map of angle of attack associated with the fixed wings with Reynolds number, including conditions of separated flow over the fixed wings and conditions of partially and/or fully attached flow over the fixed wings. Such methods also include the step of using the operating map for guidance, causing the air vehicle to operate at least within a low Reynolds numbers range corresponding to the operating map, such as to avoid or minimize risk of causing the air vehicle to operate at conditions of separated flow over the fixed wings.

GENERAL DESCRIPTION

According to a first aspect of the presently disclosed subject matter, there is provided a method for transitioning an air vehicle from a forward speed mode to a hover mode via a transition mode, the method comprising:
(a) providing the air vehicle, wherein the air vehicle is a VTOL-type fixed wing air vehicle, comprising a first propulsion system, a second propulsion system and a fixed wing arrangement, wherein:
  said first propulsion system is configured for providing a first thrust to the air vehicle at a first thrust vector, the first thrust being sufficient for enabling powered aerodynamic flight to the air vehicle at least in said forward speed mode;
  said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and
  said fixed wing arrangement comprises high lift, mild stall wings;
(b) causing the air vehicle to follow a transient path in said transition mode from said forward speed mode to said hover mode, wherein said transient path comprises manipulating a first magnitude of angle of attack of the air vehicle and a second magnitude of forward speed of the air vehicle during said transitioning to provide a corresponding aerodynamic lift component, and concurrently manipulating a third magnitude of said second thrust during said transitioning to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero, and wherein a stall plateau of the high lift, mild stall wings enables said step of manipulating the first magnitude of angle of attack of the air vehicle and the second magnitude of forward speed of the air vehicle to provide said first magnitude of angle of attack corresponding to a high angle of attack, thereby enabling the spatially fixed second thrust vector to provide an aft braking force during said transition mode.

Alternatively, according to the first aspect of the presently disclosed subject matter, there is provided a method for transitioning an air vehicle from a forward speed mode to a hover mode via a transition mode, the method comprising:
(a) providing the air vehicle, wherein the air vehicle is a VTOL-type fixed wing air vehicle, comprising a first propulsion system, a second propulsion system and a fixed wing arrangement, wherein:
  said first propulsion system is configured for providing a first thrust to the air vehicle at a first thrust vector, the first thrust being sufficient for enabling powered aerodynamic flight to the air vehicle at least in said forward speed mode;
  said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and
  said fixed wing arrangement comprises high lift, mild stall wings;
(b) causing the air vehicle to follow a transient path in said transition mode from said forward speed mode to said hover mode, wherein said transient path comprises manipulating a first magnitude of angle of attack of the air vehicle and a second magnitude of forward speed of the air vehicle during said transitioning to provide a corresponding aerodynamic lift component, and concurrently manipulating a third magnitude of said second thrust during said transitioning to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero, and wherein said step of manipulating the first magnitude of angle of attack of the air vehicle and the second magnitude of forward speed of the air vehicle comprises providing said first magnitude of angle of attack corresponding to a stall plateau of the high lift, mild stall wings, thereby enabling the spatially fixed second thrust vector to provide a braking effect, in particular a significant braking effect on the forward speed.

Alternatively, according to the first aspect of the presently disclosed subject matter, there is provided a method for transitioning an air vehicle from a forward speed mode to a hover mode via a transition mode, the method comprising:
(a) providing the air vehicle, wherein the air vehicle is a VTOL-type fixed wing air vehicle, comprising a first propulsion system, a second propulsion system and a fixed wing arrangement, wherein:
said first propulsion system is configured for providing a first thrust to the air vehicle at a first thrust vector, the first thrust being sufficient for enabling powered aerodynamic flight to the air vehicle at least in said forward speed mode;
said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and
said fixed wing arrangement comprises high lift, mild stall wings;
(b) causing the air vehicle to follow a transient path in said transition mode from said forward speed mode to said hover mode, wherein said transient path comprises manipulating a first magnitude of angle of attack of the air vehicle and a second magnitude of forward speed of the air vehicle during said transitioning to provide a corresponding aerodynamic lift component, and concurrently manipulating a third magnitude of said second thrust during said transitioning to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero, and
wherein said step of manipulating the first magnitude of angle of attack of the air vehicle and the second magnitude of forward speed of the air vehicle comprises providing said first magnitude of angle of attack to provide a high angle of attack of at least 8°, or at least 8.5°, or at least 9° or at least 9.5° or at least 10° thereby enabling the spatially fixed second thrust vector to provide a braking effect, in particular a significant braking effect on the forward speed.

For example, regarding the first aspect of the presently disclosed subject matter, such a significant braking effect on the forward speed can be such as to enable providing an aft force in the direction opposite to the forward speed, such an aft force being, for example, at least 14%, or at least 15%, or at least 15.5%, or at least 16.5%, or at least 17.4% of the second thrust.

Also according to a first aspect of the presently disclosed subject matter, there is provided a method for transitioning an air vehicle from a forward speed mode to a hover mode via a transition mode, the method comprising:
(a) providing the air vehicle, wherein the air vehicle is a VTOL-type fixed wing air vehicle, comprising a first propulsion system, a second propulsion system and a fixed wing arrangement, wherein:
said first propulsion system is configured for providing a first thrust to the air vehicle at a first thrust vector, the first thrust being sufficient for enabling powered aerodynamic flight to the air vehicle at least in said forward speed mode;
said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and
said fixed wing arrangement comprises high lift, mild stall wings;
(b) causing the air vehicle to follow a transient path in said transition mode from said forward speed mode to said hover mode, wherein said transient path comprises manipulating a first magnitude of angle of attack of the air vehicle and a second magnitude of forward speed of the air vehicle during said transitioning to provide a corresponding aerodynamic lift component, and concurrently manipulating a third magnitude of said second thrust during said transitioning to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero, and
wherein said step of manipulating the first magnitude of angle of attack of the air vehicle and the second magnitude of forward speed of the air vehicle comprises providing said first magnitude of angle of attack corresponding to a stall plateau of the high lift, mild stall wings, thereby enabling the spatially fixed second thrust vector to provide an aft braking force during said transition mode.

For example, said aft braking force is a significant aft braking force, for example having a magnitude that is at least 14%, or at least 15%, or at least 15.5%, or at least 16.5%, or at least 17.4% of the second thrust.

Additionally or alternatively, for example, said second thrust vector is generally orthogonal with respect to said first thrust vector.

Additionally or alternatively, for example, said first thrust vector is spatially fixed with respect to the air vehicle at a second fixed spatial position that is unchanged at least during said transitioning.

Additionally or alternatively, for example, said second thrust vector is generally vertical when the air vehicle has a longitudinal axis thereof oriented horizontally.

Additionally or alternatively, for example, said step of manipulating the first magnitude of angle of attack of the air vehicle and the second magnitude of forward speed of the air vehicle comprises reducing said second magnitude of forward speed of the air vehicle from a maximum forward speed to a minimum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero. For example, said maximum forward speed corresponds to a minimum forward speed limit with angle of attack for the air vehicle in which the air vehicle can operate in forward speed mode.

Additionally or alternatively, for example, the method comprises providing a first upper operating limit regarding said first magnitude of said angle of attack corresponding to a first maximum angle of attack limit prior to aileron stall of ailerons associated with said fixed wing arrangement. For example, said first upper operating limit corresponds to said first magnitude of said angle of attack being about 18°.

Additionally or alternatively, for example, the method comprises providing a first upper operating limit regarding said first magnitude of said angle of attack corresponding to a second upper operating limit corresponding to a second maximum angle of attack limit at aileron stall of ailerons associated with said fixed wing arrangement.

Additionally or alternatively, for example, the air vehicle comprises a horizontal tail, and wherein the method comprises providing a third upper operating limit regarding said first magnitude of said angle of attack corresponding to a third upper operating limit corresponding to a third maximum angle of attack limit corresponding to horizontal tail stall of said horizontal tail.

Additionally or alternatively, for example, the method comprises reducing said forward speed from said maximum forward speed to a first intermediate forward speed greater than said minimum forward speed, and concurrently maintaining said first magnitude of angle of attack at greater than about 10°. For example, the method comprises reducing said forward speed from said maximum forward speed to said first intermediate forward speed, and concurrently maintaining said first magnitude of angle of attack between about 12° and about 15°.

Additionally or alternatively, for example, the method further comprises reducing said forward speed from said first intermediate forward speed to said minimum forward speed, and concurrently reducing said first magnitude of angle of attack to less than about 5°.

Additionally or alternatively, for example, the second thrust vector is inclined to an imaginary vertical line at an angle corresponding to or correlated with the angle of attack, thereby providing a horizontal vectored thrust component associated with the respective said vertical vectored thrust component. For example, said horizontal thrust vector is in an aft direction opposed to the direction of motion of the air vehicle.

Additionally or alternatively, for example, said second propulsion system comprises a plurality of rotors exposed to a forward atmospheric airflow at least during said transition mode, and wherein at said first magnitude of angle of attack at least part of the forward atmospheric airflow impinges the rotors such as to aid rotation thereof about their respective rotor axes.

Additionally or alternatively, for example, the method comprises providing an operating map including said angle of attack associated with the high lift mild stall fixed wings with forward speed, conditions of separated flow over the fixed wings, and conditions of attached flow over the fixed wings; and, using the operating map, causing the air vehicle to operate at least within an angle of attack range corresponding to the operating map, such as to minimize time required for transiting from said forward speed mode to said hover mode via said transition mode. For example, said operating map is in electronic form in a memory or processor of a computer. Additionally or alternatively, for example, the operating map includes:

a first operating region in said operating map comprising a plurality of first points therein, each of said plurality of first points representing a respective first set of a respective said angle of attack and a respective said forward speed, said first operating region defining a first operating boundary comprising a first variation of a maximum forward speed limit with said angle of attack;

a second operating region in said operating map comprising a plurality of second points therein, each of said plurality of second points representing a respective second set of a respective said angle of attack and a respective said forward speed, said second operating region defining a second operating boundary comprising a second variation of a minimum forward speed limit with said angle of attack;

a third operating region in said operating map extending between said first operating boundary and said second operating boundary, said third operating region comprising a plurality of third points therein, each of said plurality of third points representing a respective third set of a respective said angle of attack and a respective said forward speed;

a fourth operating region in said operating map comprising a plurality of fourth points therein, each of said plurality of fourth points representing a respective fourth set of a respective said angle of attack and a respective said forward speed, said fourth operating region extending away from said second operating boundary;

wherein:
each of said plurality of first points in said first operating region corresponding to conditions fully separated flow over the fixed wings of the air vehicle or of zero flow over the fixed wings of the air vehicle, irrespective of whether or not the first point was reached from any one of said third points;

each of said plurality of second points in said second operating region corresponding to conditions of attached flow over the fixed wings irrespective of whether or not the respective said second point was reached from any one of said third points, wherein said conditions of attached flow over the wings are sufficient to generate aerodynamic lift, and wherein a magnitude of such aerodynamic lift is insufficient to maintain straight level flight for the air vehicle; and each of said plurality of third points in said third operating region corresponding to (i) conditions of attached flow or to (ii) conditions of separated flow or zero flow over the fixed wings, depending on whether the respective said third point was reached from any one of said plurality of second points or from any one of said plurality of first points, respectively;

each of said plurality of fourth points in said fourth operating region corresponding to conditions of attached flow over the fixed wings sufficient to generate aerodynamic lift having sufficient at least to maintain straight level flight for the air vehicle.

According to a second aspect of the presently disclosed subject matter, there is provided a method for transitioning an air vehicle between a forward speed mode and a hover mode via a transition mode, the method comprising:

(a) providing the air vehicle, wherein the air vehicle is a VTOL-type fixed wing air vehicle, comprising a first propulsion system, a second propulsion system and a fixed wing arrangement, wherein:

said first propulsion system is configured for providing a first thrust to the air vehicle at a first thrust vector, the first thrust being sufficient for enabling powered aerodynamic flight to the air vehicle at least in said forward speed mode;

said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and said fixed wing arrangement comprises high lift, mild stall wings;

(b) causing the air vehicle to follow a transient path in said transition mode between said forward speed mode and said hover mode, wherein said transient path comprises manipulating a first magnitude of angle of attack of the air vehicle and a second magnitude of forward speed of the air vehicle during said transitioning to provide a corresponding aerodynamic lift component, and concurrently manipulating a third magnitude of said second thrust during said transitioning to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero.

For example, said second thrust vector is generally orthogonal with respect to said first thrust vector.

Additionally or alternatively, for example, said first thrust vector is spatially fixed with respect to the air vehicle at a second fixed spatial position that is unchanged at least during said transitioning.

Additionally or alternatively, for example, said second thrust vector is generally vertical when the air vehicle has a longitudinal axis thereof oriented horizontally.

Additionally or alternatively, for example, the method comprises transitioning the air vehicle from said forward speed mode to said hover mode via said transition mode. For example, said step of manipulating the first magnitude of angle of attack of the air vehicle and the second magnitude of forward speed of the air vehicle comprises providing said first magnitude of angle of attack corresponding to a stall plateau of the high lift, mild stall wings.

Additionally or alternatively, for example, said step of manipulating the first magnitude of angle of attack of the air vehicle and the second magnitude of forward speed of the air vehicle comprises reducing said second magnitude of forward speed of the air vehicle from a maximum forward speed to a minimum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero. For example, said maximum forward speed corresponds to a minimum forward speed limit with angle of attack for the air vehicle in which the air vehicle can operate in forward speed mode.

Additionally or alternatively, for example, the method comprises providing a first upper operating limit regarding said first magnitude of said angle of attack corresponding to a first maximum angle of attack limit prior to aileron stall of ailerons associated with said fixed wing arrangement. For example, said first upper operating limit corresponds to said first magnitude of said angle of attack being about 18°.

Additionally or alternatively, for example, the method comprises providing a first upper operating limit regarding said first magnitude of said angle of attack corresponding to a second upper operating limit corresponding to a second maximum angle of attack limit at aileron stall of ailerons associated with said fixed wing arrangement.

Additionally or alternatively, for example, the air vehicle comprises a horizontal tail, and wherein the method comprises providing a third upper operating limit regarding said first magnitude of said angle of attack corresponding to a third upper operating limit corresponding to a third maximum angle of attack limit corresponding to horizontal tail stall of said horizontal tail.

Additionally or alternatively, for example, the method comprises reducing said forward speed from said maximum forward speed to a first intermediate forward speed greater than said minimum forward speed, and concurrently maintaining said first magnitude of angle of attack at greater than about 10°. For example, the method comprises reducing said forward speed from said maximum forward speed to said first intermediate forward speed, and concurrently maintaining said first magnitude of angle of attack between about 12° and about 15°.

Additionally or alternatively, for example, the method further comprises reducing said forward speed from said first intermediate forward speed to said minimum forward speed, and concurrently reducing said first magnitude of angle of attack to less than about 5°.

Additionally or alternatively, for example, second thrust vector is inclined to an imaginary vertical line at an angle corresponding to or correlated with the angle of attack, thereby providing a horizontal vectored thrust component associated with the respective said vertical vectored thrust component. For example, said horizontal thrust vector is in an aft direction opposed to the direction of motion of the air vehicle.

Additionally or alternatively, for example, the method comprises providing a suitable said first spatial fixed position and further comprising manipulating said first magnitude of angle of attack such as to provide an aft braking force during said transition.

Additionally or alternatively, for example, the method comprises transitioning the air vehicle from said hover mode to said forward speed mode via said transition mode. For example, said step of manipulating the first magnitude of angle of attack of the air vehicle and the second magnitude of forward speed of the air vehicle comprises increasing said second magnitude of forward speed of the air vehicle from a minimum forward speed to a maximum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero. For example, said maximum forward speed corresponds to a minimum forward speed limit with angle of attack for the air vehicle in which the air vehicle can operate in forward speed mode. Additionally or alternatively, for example, said method comprises increasing said forward speed from said minimum forward speed to a first intermediate forward speed less than said maximum forward speed, and concurrently maintaining said first magnitude of angle of attack at less than about 5°. For example, the method comprises increasing said forward speed from said minimum forward speed to said first intermediate forward speed, and concurrently maintaining said first magnitude of angle of attack between about 2° and about 0°. Additionally or alternatively, for example, the method comprises increasing said forward speed from said minimum forward speed to said first intermediate forward speed, and concurrently providing a negative value for said first magnitude of angle of attack. Additionally or alternatively, for example, the method further comprises increasing said forward speed from said first intermediate forward speed to said maximum forward speed, and concurrently increasing said first magnitude of angle of attack to more than about 5°.

Additionally or alternatively, for example, said second propulsion system comprises a plurality of rotors exposed to a forward atmospheric airflow at least during said transition mode, and wherein at said first magnitude of angle of attack at least part of the forward atmospheric airflow impinges the rotors such as to aid rotation thereof about their respective rotor axes.

Additionally or alternatively, for example, the method comprises providing an operating map including said angle of attack associated with the high lift mild stall fixed wings with forward speed, conditions of separated flow over the fixed wings, and conditions of partially and/or fully attached flow over the fixed wings; and, using the operating map, causing the air vehicle to operate at least within an angle of attack range corresponding to the operating map, such as to minimize time required for transiting from said forward speed mode to said hover mode via said transition mode. For example, said operating map is in electronic form in a memory or processor of a computer. Additionally or alternatively, for example, the operating map includes:

a first operating region in said operating map comprising a plurality of first points therein, each of said plurality of first points representing a respective first set of a respective said angle of attack and a respective said forward speed, said first operating region defining a first operating boundary comprising a first variation of a maximum forward speed limit with said angle of attack;

a second operating region in said operating map comprising a plurality of second points therein, each of said plurality of second points representing a respective second set of a respective said angle of attack and a respective said forward speed, said second operating region defining a second operating boundary comprising a second variation of a minimum forward speed limit with said angle of attack;

a third operating region in said operating map extending between said first operating boundary and said second operating boundary, said third operating region comprising a plurality of third points therein, each of said plurality of third points representing a respective third set of a respective said angle of attack and a respective said forward speed;

a fourth operating region in said operating map comprising a plurality of fourth points therein, each of said plurality of fourth points representing a respective fourth set of a respective said angle of attack and a respective said forward speed, said fourth operating region extending away from said second operating boundary;

wherein:

each of said plurality of first points in said first operating region corresponding to conditions fully separated flow over the fixed wings of the air vehicle or of zero flow over the fixed wings of the air vehicle, irrespective of whether or not the first point was reached from any one of said third points;

each of said plurality of second points in said second operating region corresponding to conditions of attached flow over the fixed wings irrespective 30 of whether or not the respective said second point was reached from any one of said third points, wherein said conditions of attached flow over the wings are sufficient to generate aerodynamic lift, and wherein a magnitude of such aerodynamic lift is insufficient to maintain straight level flight for the air vehicle; and each of said plurality of third points in said third operating region corresponding to (i) conditions of attached flow or to (ii) conditions of separated flow or zero flow over the fixed wings, depending on whether the respective said third point was reached from any one of said plurality of second points or from any one of said plurality of first points, respectively;

each of said plurality of fourth points in said fourth operating region corresponding to conditions of attached flow over the fixed wings sufficient to generate aerodynamic lift having sufficient at least to maintain straight level flight for the air vehicle.

According to a third aspect of the presently disclosed subject matter, there is provided a VTOL-type fixed wing air vehicle, comprising a first propulsion system, a second propulsion system and a fixed wing arrangement, wherein:

said first propulsion system is configured for providing a first thrust to the air vehicle at a first thrust vector, the first thrust being sufficient for enabling powered aerodynamic flight to the air vehicle at least in said forward speed mode;

said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and said fixed wing arrangement comprises high lift, mild stall wings; and wherein the air vehicle is configured for operating according to the method as defined herein regarding the first aspect of the presently disclosed subject matter.

For example, said second propulsion system comprises one or more propulsion units non-pivotably mounted with respect to the air vehicle.

According to a fourth aspect of the presently disclosed subject matter, there is provided a VTOL-type fixed wing air vehicle, comprising a first propulsion system, a second propulsion system and a fixed wing arrangement, wherein:

said first propulsion system is configured for providing a first thrust to the air vehicle at a first thrust vector, the first thrust being sufficient for enabling powered aerodynamic flight to the air vehicle at least in said forward speed mode;

said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transitioning; and said fixed wing arrangement comprises high lift, mild stall wings; and wherein the air vehicle is configured for operating according to the method as defined herein regarding the second aspect of the presently disclosed subject matter.

For example, said second propulsion system comprises one or more propulsion units non-pivotably mounted with respect to the air vehicle.

According to another aspect of the presently disclosed subject matter, a system is provided for carrying out the method according to the first or second aspects of the presently disclosed subject matter.

A feature of at least one example of the presently disclosed subject matter is that the time required for the respective air vehicle to transit from the forward speed mode to the hover mode via the transition mode can be minimized as compared with conventional methods.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 3(b) is a top view of the example of FIG. 3(a)

DETAILED DESCRIPTION

Figure 1:
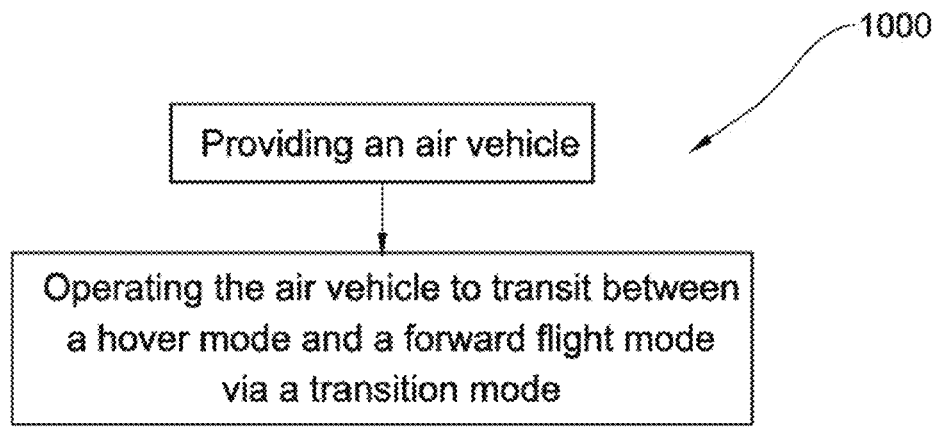
FIG. 1 schematically illustrates a method for operating an air vehicle according to an example of the presently disclosed subject matter.
Figure 2:
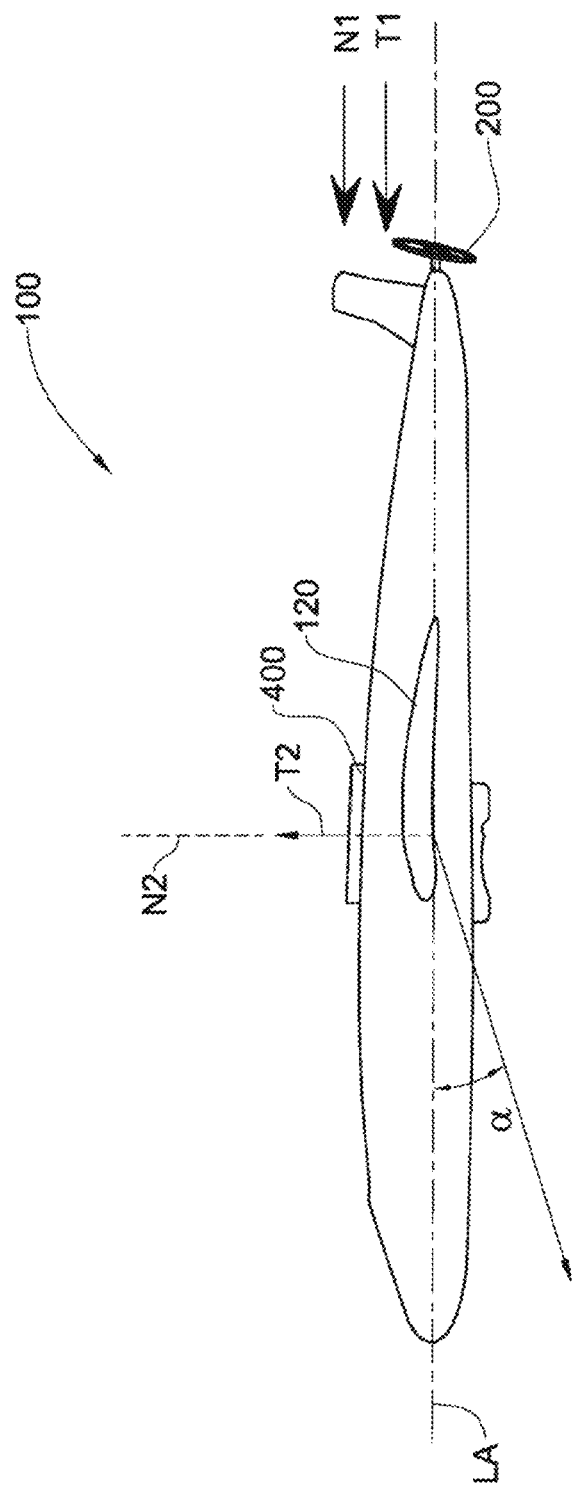
FIG. 2 is a side view of an example of an air vehicle configured for implementing a method for operating an air vehicle according to an example of the presently disclosed subject matter.

Referring to FIG. 1, a method for operating an air vehicle according to an aspect of the presently disclosed subject matter, generally designated 1000, comprises operating an air vehicle. Referring also to FIG. 2, a generic example of such an air vehicle is generally designated with reference numeral 100. In particular the operating method 1000 comprises operating the air vehicle 100 to transition between a hover mode HOM and a forward flight mode FFM (interchangeably referred to herein also as forward aerodynamic flight mode). During such transition, the air vehicle operates in transition mode TRM.

Figure 1A:
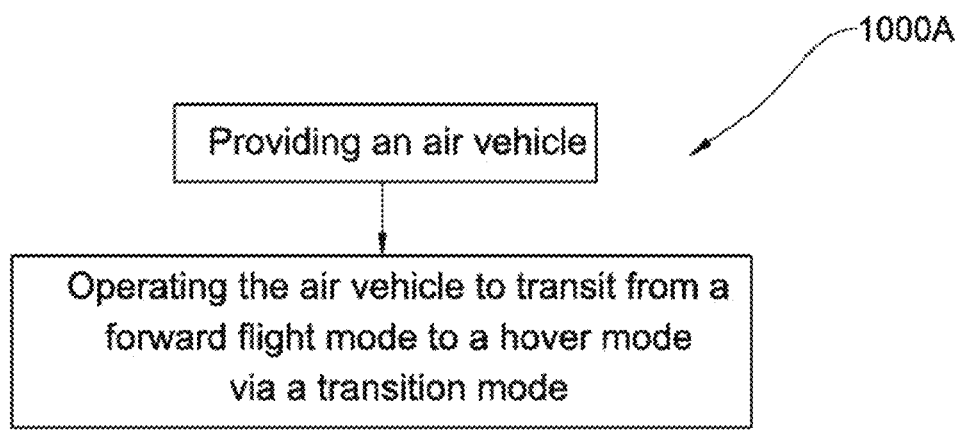
FIG. 1(a) schematically illustrates an implementation of the example of FIG. 1 for operating the air vehicle to transition from forward flight mode to hover mode via transition mode.
Figure 1B:
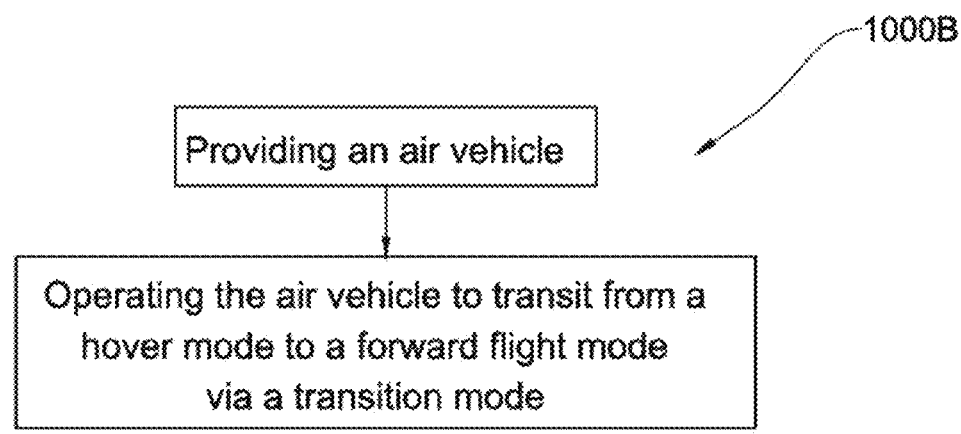
FIG. 1(b) schematically illustrates an implementation of the example of FIG. 1 for operating the air vehicle to transition from hover mode to forward flight mode via transition mode.

As will become clearer herein, and referring also to FIGS. 1(a) and 1(b), the operating method 1000 in particular comprises one or both of:
- a method 1000A for operating the air vehicle 100 to transition from forward flight mode FFM to hover mode HOM via transition mode TRM;
- a method 1000B for operating the air vehicle 100 to transition from hover mode HOM to forward flight mode FFM via transition mode TRM.

According to this aspect of the present invention, and as will become clearer herein, such an air vehicle 100 is a VTOL (vertical take-off and landing) fixed wing air vehicle, i.e., the air vehicle 100 is configured for at least hovering in the aforesaid hover mode HOM at least at a fixed altitude, and typically also enabling vertical take-off and/or vertical landing.

In addition, such an air vehicle 100 is also configured for powered aerodynamic flight via the fixed wing arrangement thereof, which includes high lift, mild stall wings 120. Furthermore, the air vehicle 100 comprises a first propulsion system 200 for providing a first thrust $T_1$ having a first thrust vector N1 (nominally horizontal) at least sufficient for enabling powered aerodynamic flight at least in the aforesaid forward flight mode FFM, and a second propulsion system 400 for providing a second thrust $T_2$ (nominally vertical) at least sufficient for enabling vectored thrust flight at least in the aforesaid hover mode HOM.

In at least this example, the first thrust vector N1 is spatially fixed with respect to the air vehicle 100 at a first fixed spatial position that is unchanged at least during said transitioning between the forward flight mode FFM, and the hover mode HOM.

Also in at least this example, the second thrust vector N2 is spatially fixed with respect to the air vehicle 100 at a second fixed spatial position that is unchanged at least during said transitioning between the forward flight mode FFM, and the hover mode HOM.

In at least this example, and as will become clearer herein, the second propulsion system 400 is non-pivotable, and is fixedly mounted to the air vehicle 100 such that the second thrust vector N2 is spatially fixed with respect to the air vehicle 100 at the aforesaid fixed spatial position, regardless of the mode of operation of the air vehicle 100, i.e., independently of whether the air vehicle 100 is operating in the forward flight mode FFM, or in the hover mode HOM, or in the transition mode TRM. However, in alternative variations of this example, the second propulsion system 400 is pivotably mounted to the air vehicle 100 such that the second thrust vector N2 can be selectively varies with respect to the air vehicle. However in such cases, and according to an aspect of the presently disclosed subject matter, at least during operation in transition mode TRM the second propulsion system 400 is constrained to retain the respective second thrust vector N2 spatially fixed with respect to the air vehicle 100 at the aforesaid fixed spatial position.

Furthermore, and as will become clearer herein, in at least this example the second thrust vector N2 is generally orthogonal with respect to the first thrust vector N1, which is typically parallel to the longitudinal axis LA of the air vehicle 100.

Furthermore, and as will become clearer herein, in at least this example the second thrust vector N2 is generally vertical when the air vehicle 100 has the longitudinal axis LA thereof oriented horizontally.

In at least this example, the first propulsion system 200 and the second propulsion system 400 are different from one another structurally. Furthermore, and also in least this example, the first propulsion system 200 and the second propulsion system 400 can operate independently from one another. Thus, for example, in forward flight mode FFM only the first propulsion system 200 is required to operate to provide the respective operating thrust, while in the aforesaid hover mode HOM only the second propulsion system 400 is required to operate to provide the respective operating thrust. However, and as will become clearer herein, it is to be noted that operation of the first propulsion system 200 and the second propulsion system 400 can be synchronized to operate concurrently, for example during transition mode TRM between the hover mode HOM and the forward flight mode FFM, i.e., transition from hover mode HOM and the forward flight mode FFM via transition mode TRM, and transition from forward flight mode FFM to hover mode HOM via transition mode TRM.

Thus, for example, the aforesaid hover mode HOM can be defined as an operating mode for the air vehicle 100 in which the air vehicle 100 operates exclusively in vectored thrust mode, wherein the second propulsion system 400 is configured for providing the aforesaid second thrust $T_2$ sufficient for enabling the air vehicle 100 to hover at least at a fixed altitude above the ground. In general, the second propulsion system 400 is further configured for providing a level of second thrust $T_2$ higher than the minimum second thrust $T_2$, i.e., an excess thrust in addition to the minimum second thrust $T_2$ required for hover, to thereby also provide vectored thrust control in the aforesaid hover mode HOM and/or for enabling the air vehicle 100 to change altitude during hover.

Additionally, for example, the aforesaid forward flight mode FFM can be defined as an operating mode the air vehicle 100 wherein the air vehicle 100 operates exclusively to provide powered aerodynamic flight, in which the first propulsion system 200 is configured for providing the first thrust $T_1$ sufficient for enabling the air vehicle to fly in powered aerodynamic flight at forward speeds not less than the stall speed $V_{stall}$ of the air vehicle 100 (corresponding to the angle of attack of the air vehicle 100), and in which the wings 120 are configured for providing the necessary lift for such powered aerodynamic flight.

Additionally, for example, the aforesaid transition mode TRM can be defined as an operating mode of the air vehicle 100 wherein the air vehicle 100 operates to provide concurrently partial powered aerodynamic flight and powered vectored flight in complementary proportions to generate an aggregate upward force sufficient to balance the weight of the air vehicle 100. The aggregate upward force is made up of an aerodynamic lift contribution and a vectored thrust contribution, and the relative proportions between the two varies during the transition mode TRM. Thus, the second propulsion system 400 is configured for providing the aforesaid second thrust $T_2$ but having a magnitude insufficient for enabling the air vehicle 100 to hover at least at a fixed altitude above the ground-rather the level of second thrust $T_2$ provides the vectored thrust contribution, and makes up for the shortfall in lift force generated during transition mode TRM. Thus, when transitioning from hover mode HOM to forward flight mode FFM via transition mode TRM, the lift force contribution progressively increases to a maximum while concurrently the vectored thrust contribution decreases progressively pro-rata to zero. Conversely, when transitioning from forward flight mode FFM to hover mode HOM via transition mode TRM, the lift force contribution progressively decreases to a minimum while concurrently the vectored thrust contribution increases progressively pro-rata to the level required for hover mode HOM.

It is to be noted that at least during execution of the method 1000, the thrust vector N2 of the second propulsion system 400 is fixed with respect to the air vehicle 100, for example orthogonal to the longitudinal axis LA of the air vehicle 100.

Referring in particular to FIGS. 3(*a*), 3(*b*), 3(*c*), a first example of such an air vehicle, generally designated with reference numeral 100A, comprises longitudinal axis LA1, high lift, mild stall wings 120A, a first propulsion system 200A, and a second propulsion system 400A, respectively similar to the longitudinal axis LA, high lift mild stall wings 120, first propulsion system 200, and second propulsion system 400 of the example of FIG. 2, mutatis mutandis.

In at least this example, the air vehicle 100A comprises a main fuselage 110A, comprising a nose 111A, aft end 119A, and the wings 120A are in fixed spatial relationship with respect to the fuselage 110A. The first propulsion system 200A comprises a liquid fuel engine (not shown), for example an internal combustion engine or a turbojet engine, driving a pusher propeller 220A. In alternative variations of this example, the first propulsion system 200A can instead or in addition comprise an electrical motor and/or a hybrid engine, configured for driving the propeller 220A. In these or other alternative variations of this example, the first propulsion system 220A can be, additionally or alternatively, configured for driving a tractor propeller.

In at least this example, the second propulsion system 400A comprises a set of four second propulsion units 450A in rectangular arrangement around the center of gravity CGA of the air vehicle 100A. In alternative variations of this example, the second propulsion system 400A can instead include three, five, six, seven, eight, or more than eight aforesaid second propulsion units 450A, suitably arranged around the center of gravity CGA of the respective air vehicle.

As best seen in FIG. 3(*b*), a forward set of two of the second propulsion units 450A are spaced forward of the center of gravity CGA, and an aft set including the other two second propulsion units 450A are spaced aft of the center of gravity CGA. Thus, operation of the second propulsion system 400A to generate differential thrust between the forward set of second propulsion units 450A and the aft set of second propulsion units 450A enables pitch control of the air vehicle 100A, particularly in vectored flight and more particularly in hover mode HOM, though this pitch control method can also be used for providing or supplementing pitch control in forward flight mode FFM.

Furthermore, each one of the forward set and the aft set has a respective second propulsion unit 450A on the port side of the air vehicle 100A, and a respective second propulsion unit 450A on the starboard side of the air vehicle 100A. Thus, operation of the second propulsion system 400A to generate differential thrust between the set of two port second propulsion units 450A and the set of two starboard second propulsion units 450A enables roll control of the air vehicle 100A, particularly in vectored flight and more particularly in hover mode HOM, though this roll control method can also be used for providing or supplementing roll control in forward flight mode FFM.

In at least this example, the second propulsion units 450A of the port set are each mounted onto a port boom 462A, and the second propulsion units 450A of the starboard set are each mounted onto a starboard boom 464A. The port boom 462A and the starboard boom 464A are mounted to the respective port said wing 120A and the respective starboard said wing 120A, at a respective intermediate location between the respective wing root and the respective wing tip.

In at least this example, each second propulsion unit 450A comprises a respective electric motor system 452A driving a pair of counter-rotating propellers 455A. However, in alternative variations of this example each second propulsion unit 450A can instead include a single propeller.

The second propulsion units 450A can also be operated to provide yaw control for the air vehicle 100A. In at least this example, in which each second propulsion unit 450A comprises a respective electric motor system 452A driving a pair of counter-rotating propellers 455A, the upper propellers 455A of all the second propulsion unit 450A are rotating in one direction (for example in a clockwise direction when viewed from above the air vehicle 100A), and the lower propellers 455A of all the second propulsion unit 450A are rotating in the opposite direction (for example in a counter-clockwise direction when viewed from above the air vehicle 100A). In such a case, and in order to induce yaw in one direction (for example in a clockwise direction when viewed from above the air vehicle 100A), the rotational speed of the respective upper propellers 455A of all the second propulsion units 450A is increased, thereby increasing the thrust output of the upper propellers 455A. However, concurrently, the rotational speed of the lower propellers 455A of all the second propulsion unit 450A is decreased, thereby compensating for the increase of the thrust output of the upper propellers 455A. Accordingly, the net thrust generated by all the second propulsion units 450A is unchanged, but the relative higher angular momentum of the upper propellers 455A in the clockwise direction relative to the lower angular momentum of the lower propellers 455A in the counter-clockwise direction results in a net angular momentum in a clockwise direction, thereby providing the required yaw in the clockwise direction. Conversely, a yaw moment in the counter-clockwise direction can be induced in a similar manner, mutatis mutandis, but by instead increasing the angular momentum of the lower propellers 455A as compared with the upper propellers 455A. Such operation of the second propulsion units 450A concurrently maintains the total thrust, as well as stability in pitch and roll. However, it is also possible to operate the second propulsion units 450A to concurrently change altitude (by increasing the overall vertical thrust) and/or induce a pitch moment (by changing the differential vertical thrust forward vs. aft) and/or induce a roll moment (changing the differential vertical thrust port vs. starboard).

There are of course many other different options for inducing yaw moments, depending on how the propellers 455A of the individual second propulsion units 450A are configured for rotating and the relative locations of the second propulsion units 450A with respect to one another.

In at least some other alternative variations of this example, in which each second propulsion unit 450A comprises a respective electric motor system driving a single rotating propeller, the propellers of the two second propulsion unit that are located forward/port and aft/starboard are rotating in the same direction to one another (for example in a clockwise direction when viewed from above the air vehicle 100A), while the propellers of the other two second propulsion unit that are located forward/starboard and aft/port are rotating in the same direction to one another, but opposite to the first two second propulsion units (for example in a clockwise direction when viewed from above the air vehicle 100A). In such cases, yaw moments in one direction can be induced by increasing the rotations speed of the two propellers that are rotating in the desired direction, while concurrently decreasing the rotational speed of the other two propellers that are rotating in the opposite direction. The overall thrust can thus be maintained as before, and this arrangement also enables pitch and roll stability to be maintained.

It is to be noted that, optionally, the propellers 455A of the individual second propulsion units 450A can be tilted outwardly away from the fuselage by a small acute angle, for example 5°, such as to provide a thrust component parallel to the pitch axis. This thrust component, together with the moment arm about the center of gravity, can aid in providing desired yaw moments.

In any case, it is to be noted that, in alternative variations of this example each second propulsion unit 450A can instead include a ducted fan arrangement, or a turbojet arrangement, or a turbofan arrangement.

Figure 4:
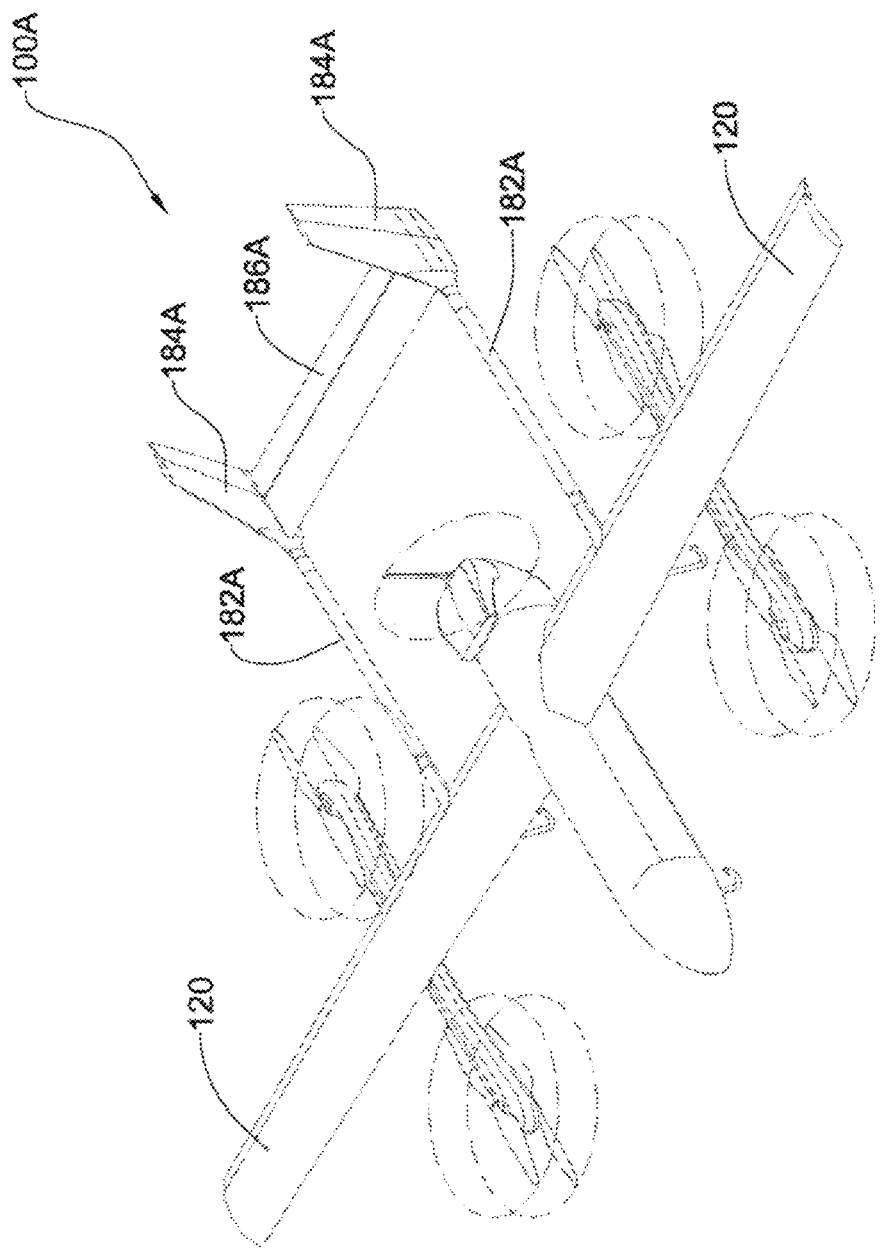
FIG. 4 is an isometric view of an alternative variation of the example of FIG. 3(a).

In at least this example, the air vehicle 100A further comprises an empennage 180A, which in at least this example is in the form of a twin tail boom, comprising a pair of laterally spaced booms 182A each comprising at an aft end thereof respective vertical stabilizers 184A, interconnected by horizontal stabilizer 186A. In at least this example each boom 182A is longitudinally attached to a respect one of the port boom 462A and the starboard boom 464A. In alternative variations of this example, and referring for example to FIG. 4, the spaced booms 182A can instead be connected at the front end thereof directly to the wings 120A, and independent of the port boom 462A and the starboard boom 464A. In yet other alternative variations of this example, other alternative configurations for the empennage can be provided.

In at least this example, the air vehicle 100A further comprises an undercarriage arrangement 130A, for example in the form of landing struts 131A.

As mentioned above, and according to an aspect of the presently disclosed subject matter the wings 120A are configured as high lift mild stall wings, i.e., each wing 120A is configured for providing high lift mild stall characteristics.

Such wings can be configured with single element aerofoils, and/or with two element slotted aerofoils and/or to aerofoils having more than one or two elements, each being configured for providing high lift mild stall characteristics. In these or other examples, for example, the wings can each have leading edge slats that provide high lift mild stall effect, which can have the effect of increasing the maximum angle of attack and maximum lift coefficient.

In this connection, single element aerofoils and two-element slotted aerofoils are known, and examples of high lift mild stall single element aerofoils and two-element slotted aerofoils are disclosed for example in U.S. Pat. No. 8,109,473, assigned to the present assignee, and the contents of which are incorporated.

Furthermore WO 2016/055990 (also assigned to the present assignee) also discloses examples of high lift mild stall two-element slotted aerofoils, in particular pages 7, 20 to 37, FIGS. 3 to 18 thereof, and the contents of which are incorporated herein by reference thereto.

Figure 5:
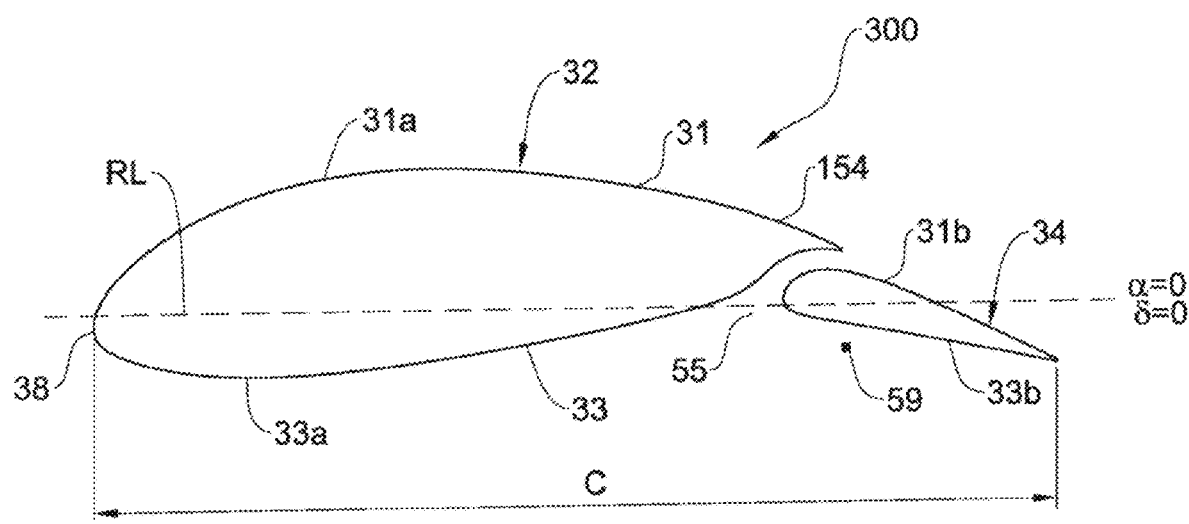
FIG. 5 illustrates a two-element high lift mild stall aerofoil according to an aspect of the presently disclosed subject matter.

Referring also to FIG. 5, each wing 120A in at least this example is based on (i.e., each wing 120A comprises a plurality of aerofoil sections at least a portion of which each correspond to) a two-element mild stall slotted aerofoil 300, also interchangeably referred to herein as ISAR-20 aerofoil 300, in particular exhibiting high lift mild stall characteristics. Aerofoil 300 comprises a first or primary element 32 (also referred to interchangeably herein as the "main body of the aerofoil", or as the "main body"), and a pivotable second or secondary element 34 (also referred to interchangeably herein as the "flap" of the aerofoil, or as the flap).

The primary element 32 comprises the leading edge 38 of the aerofoil, which coincides with the leading edge 152A of the wing 120A, and major portions 31*a*, 33*a*, of the suction surface 31 and pressure surface 33 thereof, respectively, and a trailing end 38*a*, also referred to interchangeably herein as the trailing edge of the primary element 32. The secondary element 34 comprises the trailing edge 39 of the aerofoil, which coincides with the trailing edge 154A of the wing 120A, and minor portion 31*b*, 33*b*, of the suction surface 31 and pressure surface 33 thereof, respectively. A slot 55 separates the leading end 35 of the secondary element 34 (also referred to interchangeably herein as the leading edge of the secondary element 34) from the trailing end 38*a* of the primary element 32.

For example, the location of the hinge point 59 can be chosen such as to provide a desired longitudinal overlap and a desired gap between the primary element 32 and the secondary element 34 via the slot 55.

Reference line RL is a datum line conventionally defined with respect to the aerofoil 300, and the angle of attack a of the aerofoil 300, and deflection angle δ of the secondary element 34, are defined with respect to this datum line. The deflection angle δ is also referred to interchangeably herein as flap deflection angle δ or as flap angle δ.

In at least some examples, the reference line RL for at least some aerofoils is parallel to the longitudinal axis LA1, and thus the angle of attack a also corresponds to the attack of the air vehicle. In at least this example, for example in which the wings can have twist, the reference line for some aerofoils can be at a non-zero angle to the longitudinal axis of the air vehicle, for example correlated to the twist angle at the respective aerofoil station along the wing, and/or correlated to the incidence angle of the wing with respect to the longitudinal axis.

In at least this example, the hinge point 59 of the secondary element 34 is fixed at an outwardly displaced position with respect to the lower (pressure) surface of the secondary element 34. The airflow through slot 55 provides enhanced flap efficiency and enhanced lift coefficient, as well as enhanced linearity of the aerodynamic characteristics of the aerofoil as compared to a similar non-slotted aerofoil. A suitable actuation mechanism (not shown) is provided for actuating the secondary element 34 to adopt the range of deflection angles desired, including decambering mode deflection angles, aileron mode deflection angles, airbrake mode deflection angles, etc.

The precise form of the slot 55 can generally vary with deflection angle δ of the secondary element 34, and thus generally depends on the particular mode of operation of the wing 120A. For example, in cruise/loiter mode the deflection angle δ is nominally 0°; in take-off/landing mode the deflection angle δ can be about +25°; in aileron mode the deflection angle & can be up to about +25°; in maximum speed decambering mode there is negative flap deflection, and the deflection angle & can be up to about −15°.

In airbrake mode, the secondary element 34 is deflected by a respective flap deflection angle corresponding to a design airbrake deflection angle wherein to generate an airbrake drag. Thus, in airbrake mode, the flap angle & is large, and generates significantly more drag than at flap angles associated with maximum lift coefficient of the aerofoil in which flow on the flap segment is attached or almost attached (while concurrently the maximum lift coefficient can remain almost constant). In particular, in airbrake mode the flap angle & can be more than 40°, or more than 50°, or more than 55°, or 60° or more than 60°. In each case, the respective drag coefficient is at least 150% of the value at flap angle δ of 30°, and the respective drag coefficient at these airbrake mode flap deflection angles 8 can be greater than 0.15, or greater than 0.2, or greater than 0.3, for example. For example, in airbrake mode the flow over the secondary element is fully detached.

Figure 6:
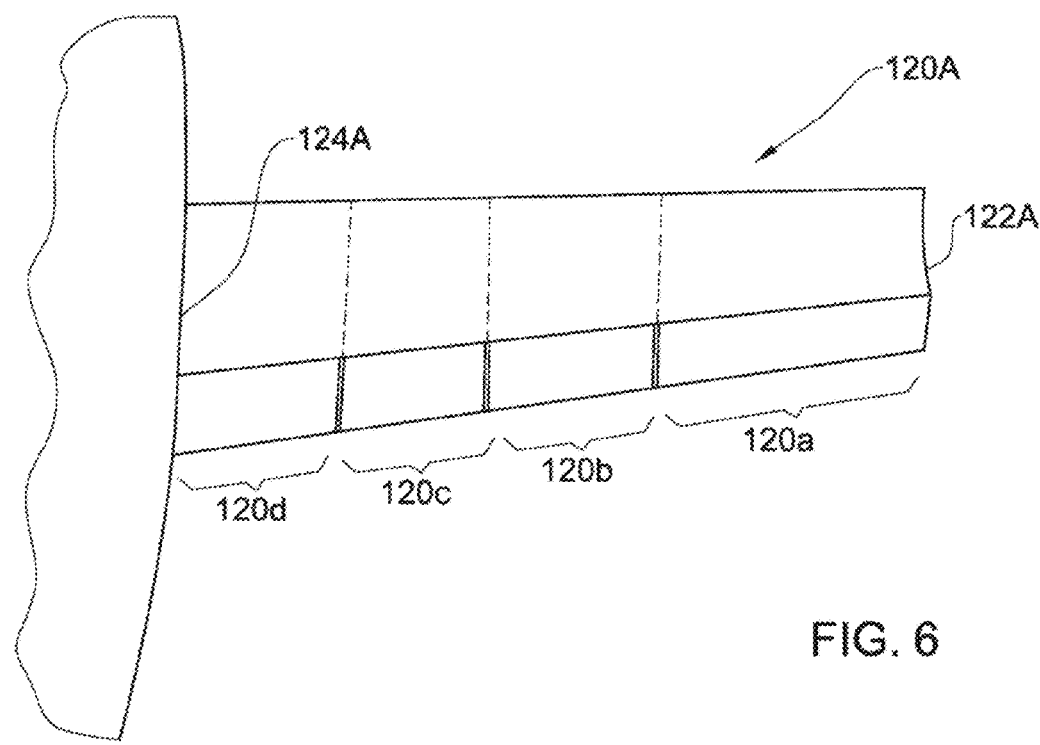
FIG. 6, is a top view of part an air vehicle including lift generating wing according to an example of the presently disclosed subject matter.

Referring to FIG. 6, each wing 120A can optionally comprise a number of span-wise wing sections, for example serially adjoining sections 120a, 102b, 120c and 120d, between the tip 122A and root 124A, in which one or more wing section the secondary element 34 is configured to perform as an air brake, while in one or more other wing section the secondary element 34 can be configured as a rigid non-movable element, or to operate within a narrower flap angle range, for example up to 30° only, thereby not operating as an airbrake, for example. For example, section 120a is configured with an aileron. For maximizing the drag effect of the airbrake, the span of the respective one or more sections 120a, 120b, 120c and 120d that include the airbrake can be maximized.

Figure 6A:
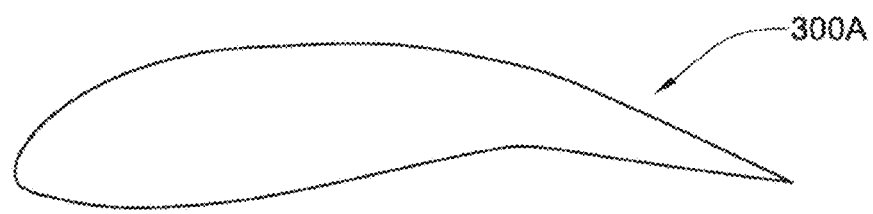
FIG. 6(a) illustrates a single-element high lift mild stall aerofoil according to an aspect of the presently disclosed subject matter.

Referring also to FIG. 6(a), in at least some examples, the respective one or more inboard sections 120b, 120c and 120d can have aerofoil sections 300A that have single element high lift mild stall characteristics similar to the aerofoil section 300, mutatis mutandis. Optionally, at least the respective single element aerofoil sections can include a leading edge slat (not shown).

By way of non-limiting example, and referring again to FIG. 5, such an aerofoil design for aerofoil 300 can include any suitable thickness-to-chord ratio (t/c) max, camber distribution, and thickness distribution. Optionally, the leading edge 38 of the aerofoil 300 can also be relatively blunt or rounded, having a low curvature leading edge radius, and aft portion of the aerofoil can also be cambered.

In at least this example, the two-element aerofoil 300 further comprises a highly cambered aft portion of primary element 32, this aft portion being referred to herein as a mild-stall ramp section 154. The profile of the mild-stall ramp section 154 is shaped for a particular design Reynolds number, such as to produce a slowly creeping trailing edge separation at post-stall angles of attack. The mild-stall ramp section 154 is configured for initiating mildly separated flow at stall angles of attack, for example at about 11°. The separated region on the mild-stall ramp section 154 at post stall angles of attack, for example at 18°, continues to grow slowly, but does not induce full separation over the primary element 32 of the two-element aerofoil 300, and enables a relatively high level of lift to be maintained at the post-stall angles of attack, for example up to an angle of attack of about 23°.

Passive controllable development of the separated region on the mild-stall ramp section 154, together with rounded pressure distributions at the leading edge 38, which can be obtained with a relatively blunt or rounded leading edge, having a relatively low curvature leading edge radius, provide mild stall characteristics at the level of lift that is generally generated with high-lift, two-element aerofoils.

Figure 7:
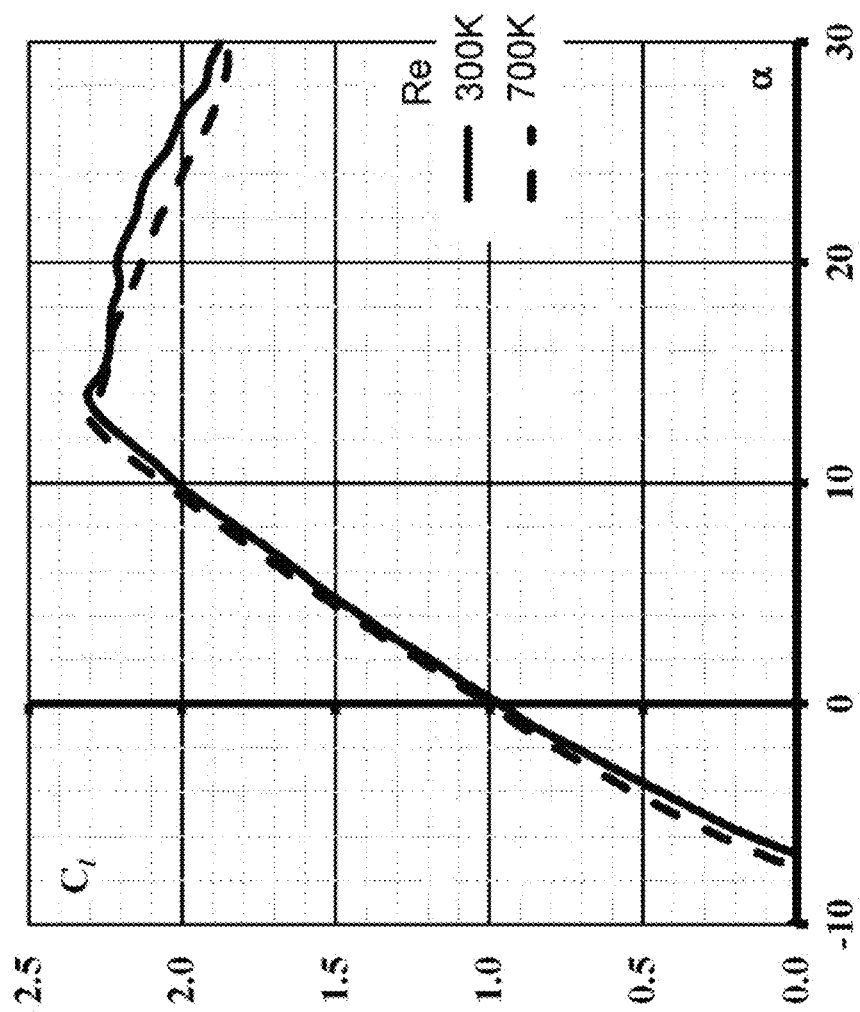
FIG. 7 illustrates a variation of lift coefficient with angle of attack, at two Reynolds numbers, for the example of the aerofoil of FIG. 5.
Figures 8A, 8B:
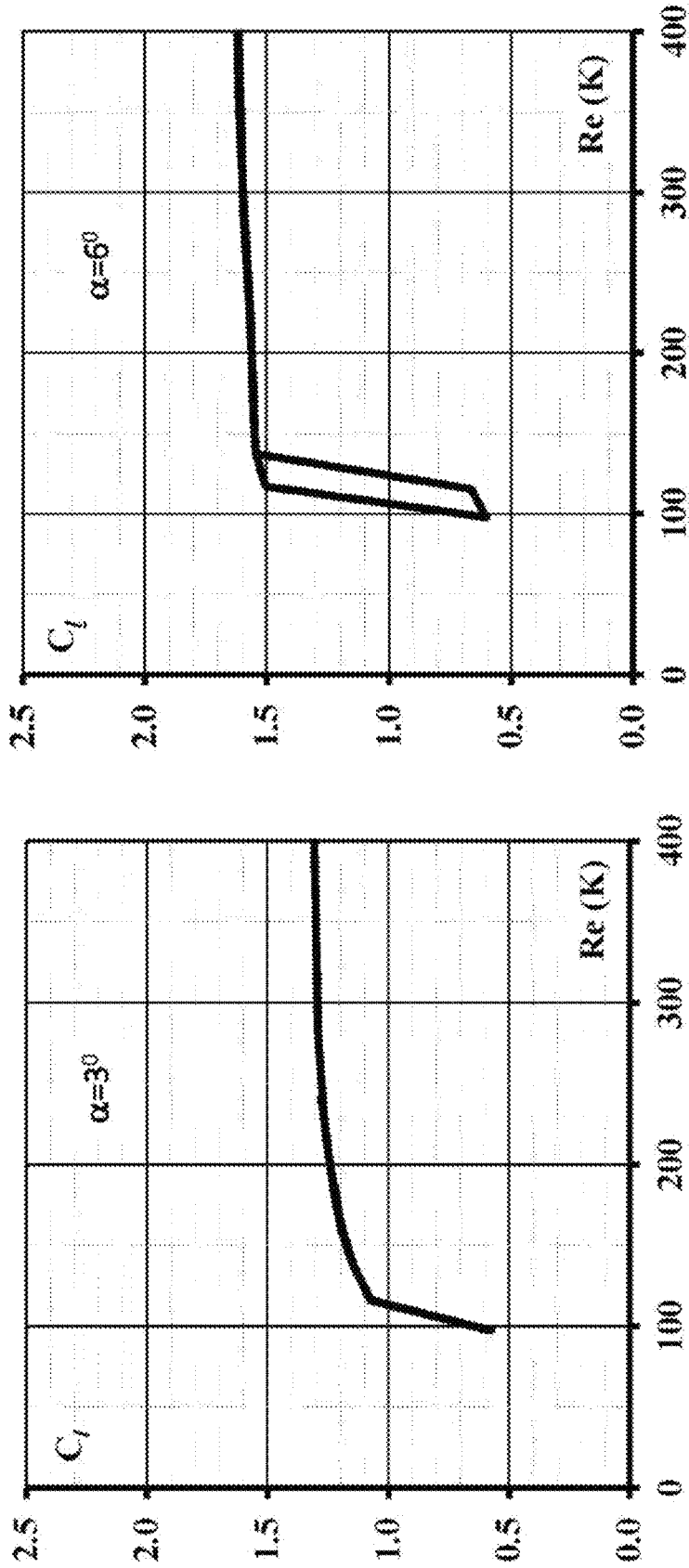
FIG. 8(a) illustrates a variation of lift coefficient with Reynolds numbers for the example of the aerofoil of FIG. 5, at angle of attack constant 3°.
FIG. 8(b) illustrates a variation of lift coefficient with Reynolds numbers for the example of the aerofoil of FIG. 5, at angle of attack constant 6°, exhibiting hysteresis loop characteristics.
Figure 8D:
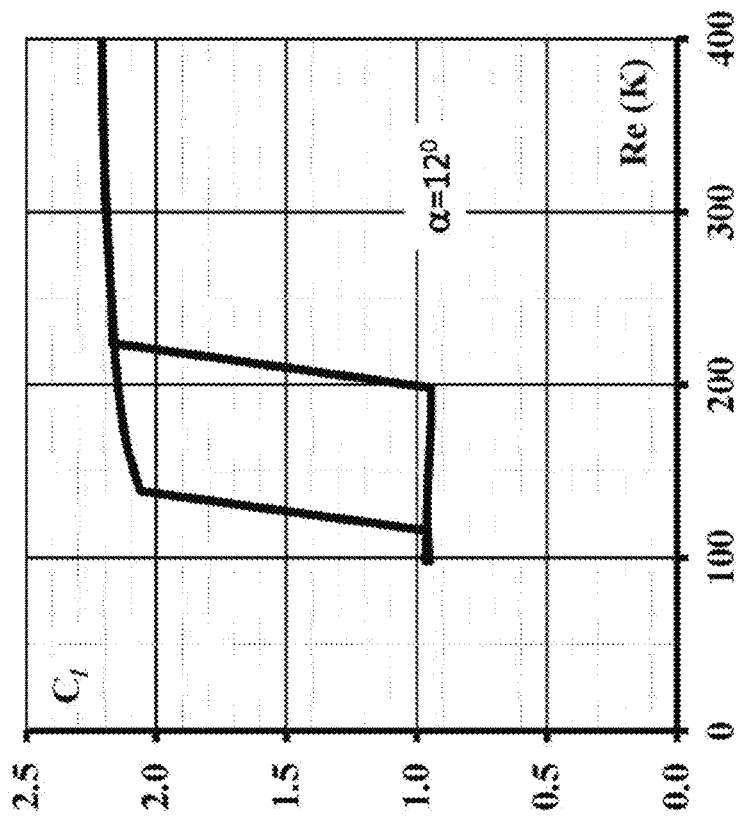
FIG. 8(d) illustrates a variation of lift coefficient with Reynolds numbers for the example of the aerofoil of FIG. 5, at angle of attack constant 12°, exhibiting hysteresis loop characteristics.
Figure 8C:
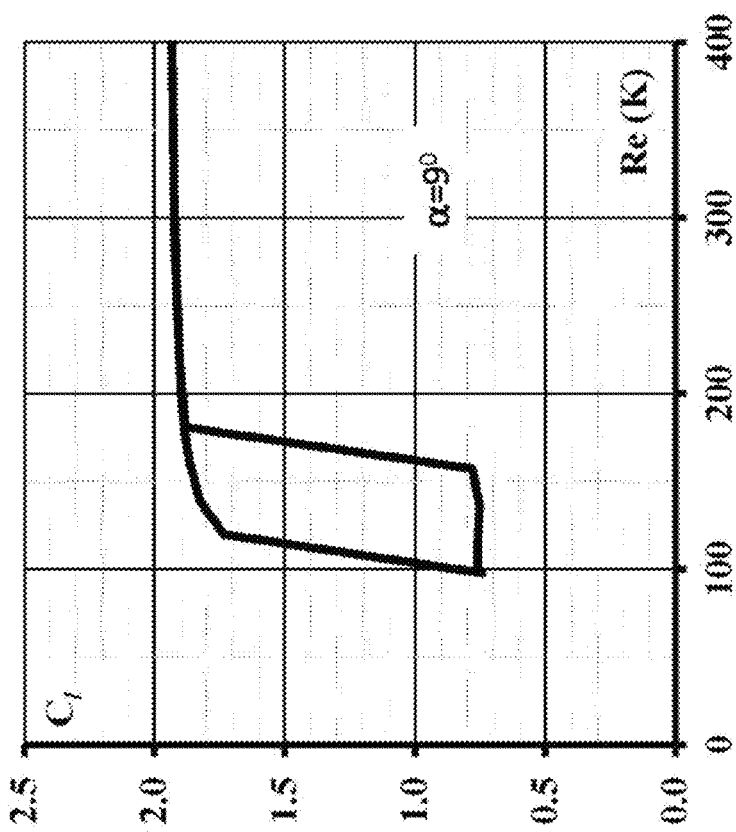
FIG. 8(c) illustrates a variation of lift coefficient with Reynolds numbers for the example of the aerofoil of FIG. 5, at angle of attack constant 9°, exhibiting hysteresis loop characteristics.
Figures 8E, 8F:
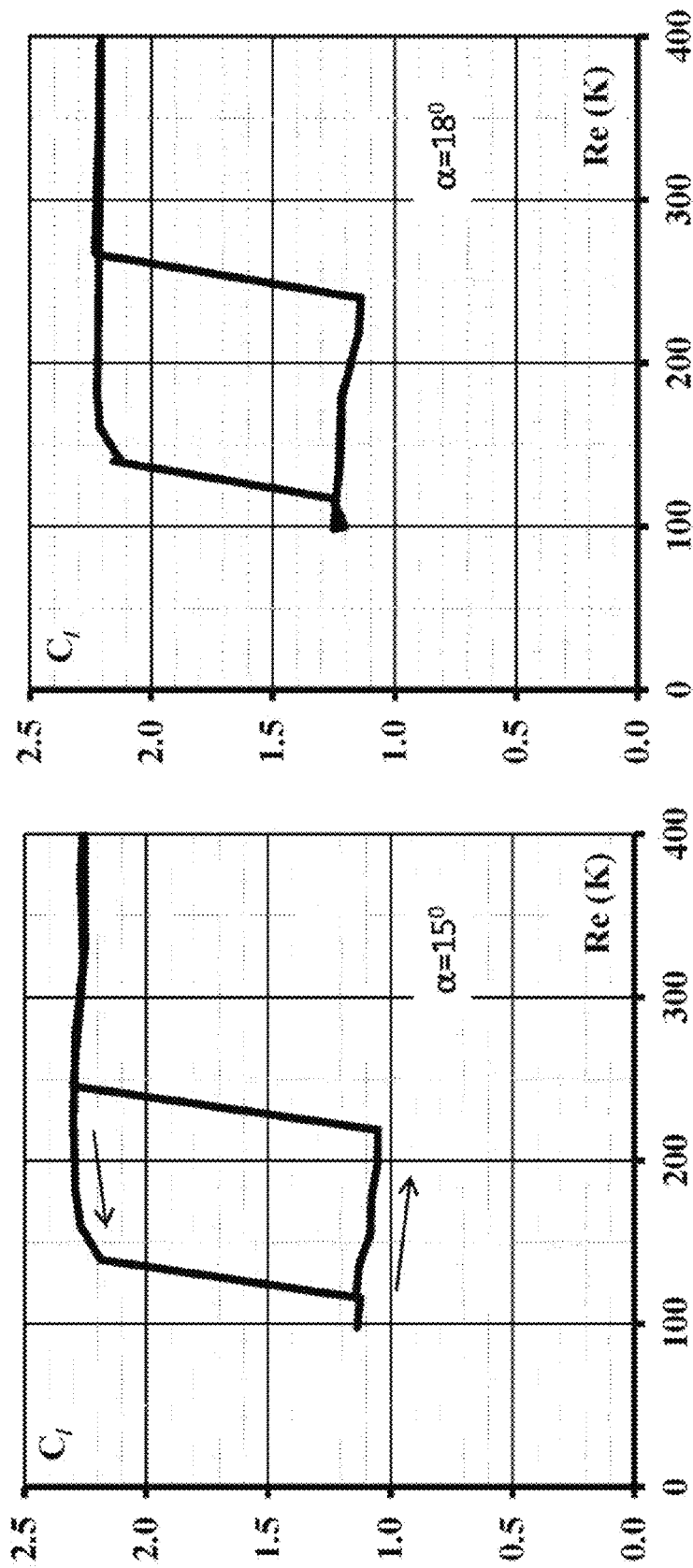
FIG. 8(e) illustrates a variation of lift coefficient with Reynolds numbers for the example of the aerofoil of FIG. 5, at angle of attack constant 15°, exhibiting hysteresis loop characteristics.
FIG. 8(f) illustrates a variation of lift coefficient with Reynolds numbers for the example of the aerofoil of FIG. 5, at angle of attack constant 18°, exhibiting hysteresis loop characteristics.
Figure 8G:
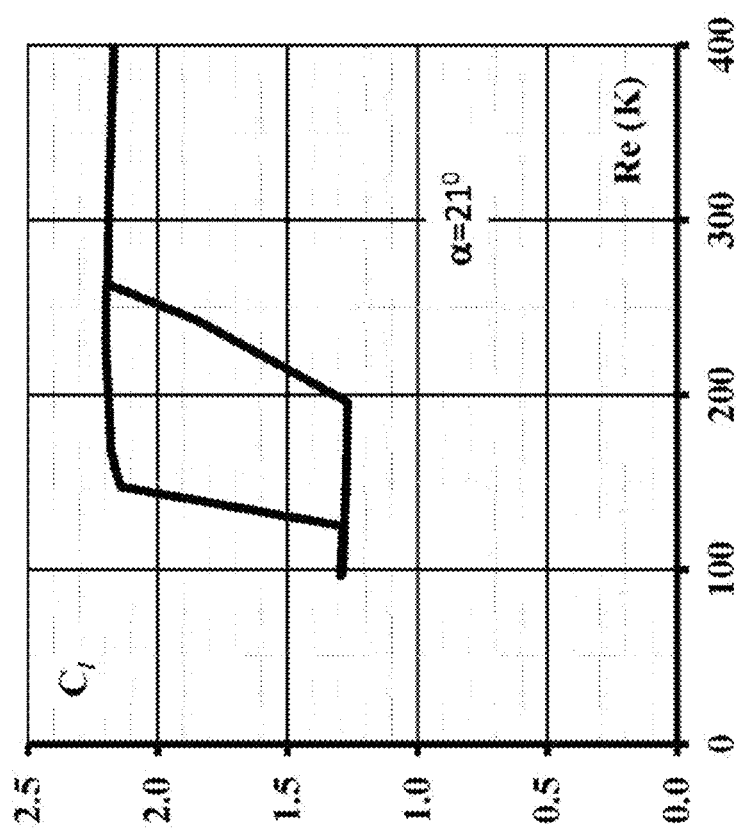
FIG. 8(g) illustrates a variation of lift coefficient with Reynolds numbers for the example of the aerofoil of FIG. 5, at angle of attack constant 21°, exhibiting hysteresis loop characteristics.
Figure 8H:
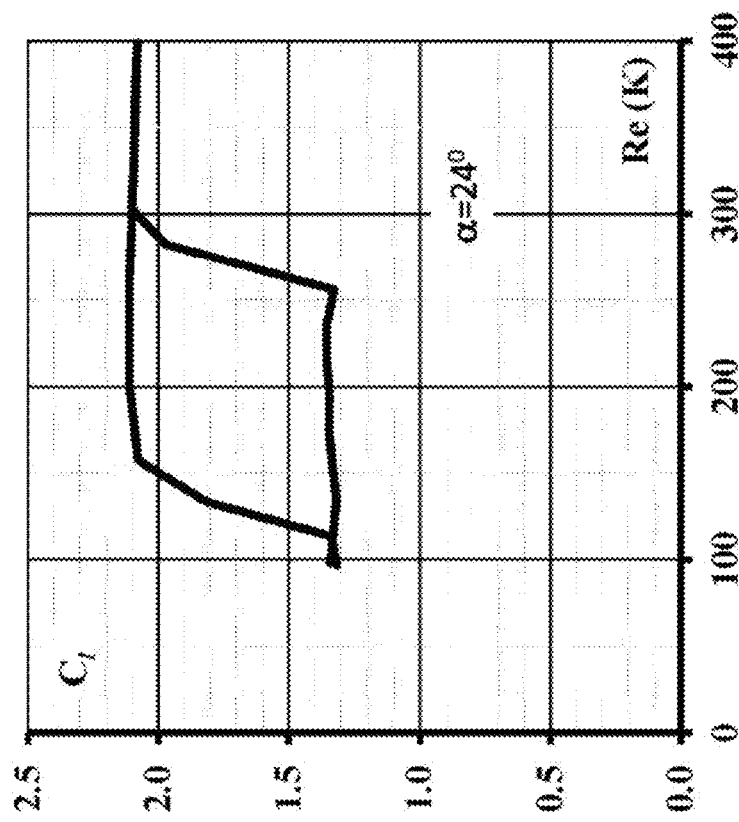
FIG. 8(h) illustrates a variation of lift coefficient with Reynolds numbers for the example of the aerofoil of FIG. 5, at angle of attack constant 24°, exhibiting hysteresis loop characteristics.

Similarly, single element high lift mild stall aerofoils can also be designed to provide similar aerodynamic lift characteristics Referring in particular to FIG. 7, aerodynamically, the aerofoil 300 maintains a stall plateau for angle of attack range of about 12° (from about angle of attack a of about 11° to about 23°) where the lift coefficient $C_1$ of the two-dimensional wing is within up to about 5% of maximum $C_1$, at Reynolds numbers of about $0.3*10^6$ According to some aspects of the presently disclosed subject matter, the mild-stall ramp section 154 can have a geometry that is dependent on the design Reynolds number for the aerofoil. In at least some examples, the geometry of the aerofoil sections including the mild-stall ramp section is matched to the design Reynolds number such as to generate high lift mild stall characteristics.

By way of non-limiting example, the aerofoil 300 comprises an 17% thickness ratio, and has $Re_{design}=0.7*10^6$ (corresponding to velocities of 1.2 or 1.3 above the stall velocity $V_{stall}$), and a particular geometry of such an aerofoil, corresponding to the geometry of the aerofoil 300 illustrated in FIG. 5, is particularly denoted herein as aerofoil ISAR-20. The stall characteristics are progressively milder as Reynolds number is reduced from stall speed.

Wind tunnel results obtained with a two-dimensional model of a zero-swept wing section, having a uniform cross-section along the span corresponding to aerofoil ISAR-20 (corresponding to aerofoil 300), are shown in FIG. 7. In particular, FIG. 7 shows lift curves obtained for the aerofoil ISAR-20, at nominal flap setting ($\delta_{flap}=0°$) for Reynolds numbers of $0.3*10^6$ and $0.7*10^6$. These results indicate an extended range of plateau lift coefficients at post-stall angles of attack, at Reynolds numbers between $0.3*10^6$ and $0.7*10^6$. For example, in this example, at Reynolds numbers $0.3*10^6$ the corresponding velocity is less than the stall velocity $V_{stall}$, depending on weight of the air vehicle for example. It is to be noted that wing loading can alter the design Reynolds number.

Referring to FIGS. 8(a) to 8(h), aerofoil ISAR-20 (corresponding to aerofoil 300) show signs of hysteresis phenomena regarding lift coefficient with Reynolds number, from very small angles of attack (less than 6° but greater than 3°) up to at least 24°. These results were obtained from a series of specially performed wind tunnel hysteresis test for aerofoil ISAR-20 at zero flap deflection (δ=0°).

The hysteresis curves indicate that for a particular angle of attack, there is a corresponding first minimum Reynolds number limit (referred to herein as the "lift-on" Reynolds number) at which there is a sharp increase in lift coefficient as Reynolds number is increased, and a lower second minimum Reynolds number limit (referred to herein as the "lift-off" Reynolds number) at which there is a sharp decrease in lift coefficient as Reynolds number is decreased.

Thus, herein, and referring again to the hysteresis curves depicted in FIGS. 8(b) to 8(h), the respective first minimum forward speed limit (corresponding to a respective first minimum Reynolds number limit) for a particular angle of attack a, is also referred to as the "lift-on" forward speed, being the forward speed at which, for the particular angle of attack, the lift increases sharply as forward speed increases, and at which transition from vectored thrust flight to aerodynamic flight commences, i.e., corresponding to the start of transition mode TRM.

Furthermore, and referring again to the hysteresis curves depicted in FIGS. 8(b) to 8(h), the respective second minimum forward speed limit (corresponding to a respective second minimum Reynolds number limit) for a particular angle of attack a is also referred to as the "lift-off" forward speed, being the forward speed at which, for the particular angle of attack, the lift decreases sharply as the forward speed is further reduced from this limit, and at which there is full transition from aerodynamic flight to vectored thrust flight, i.e., to hover mode HOM.

At angles of attack of less than about 6° the lift coefficient obtained with aerofoil ISAR-20 (corresponding to aerofoil 300) is not sensitive to the direction in which the Reynolds number (and thus the direction in which the forward speed) is changing, i.e., whether the Reynolds number (and thus the forward speed) is increasing or decreasing. In other words, increasing the Reynolds number from about $0.1*10^6$ to about $0.4*10^6$, and then decreasing the Reynolds number from about $0.4*10^6$ to about $0.1*10^6$ provides the same variation of lift coefficients with Reynolds number.

However, at an angle of attack of about 6°, there is a change, and lower lift coefficients are obtained at the Reynolds number from about $0.1*10^6$ to about $0.14*10^6$ as the forward speed is reduced, as compared with the corresponding lift coefficients obtained at similar Reynolds numbers but as the forward speed is increased. As the angle of attack is increased, the hysteresis effect increases, such that for example at angle of attack of 24°, lower lift coefficients are obtained at the Reynolds number from about $0.11*10^6$ to about $0.27*10^6$ as the forward speed is reduced, as compared with the corresponding lift coefficients obtained at similar Reynolds numbers but as the forward speed is increased.

Figure 9:
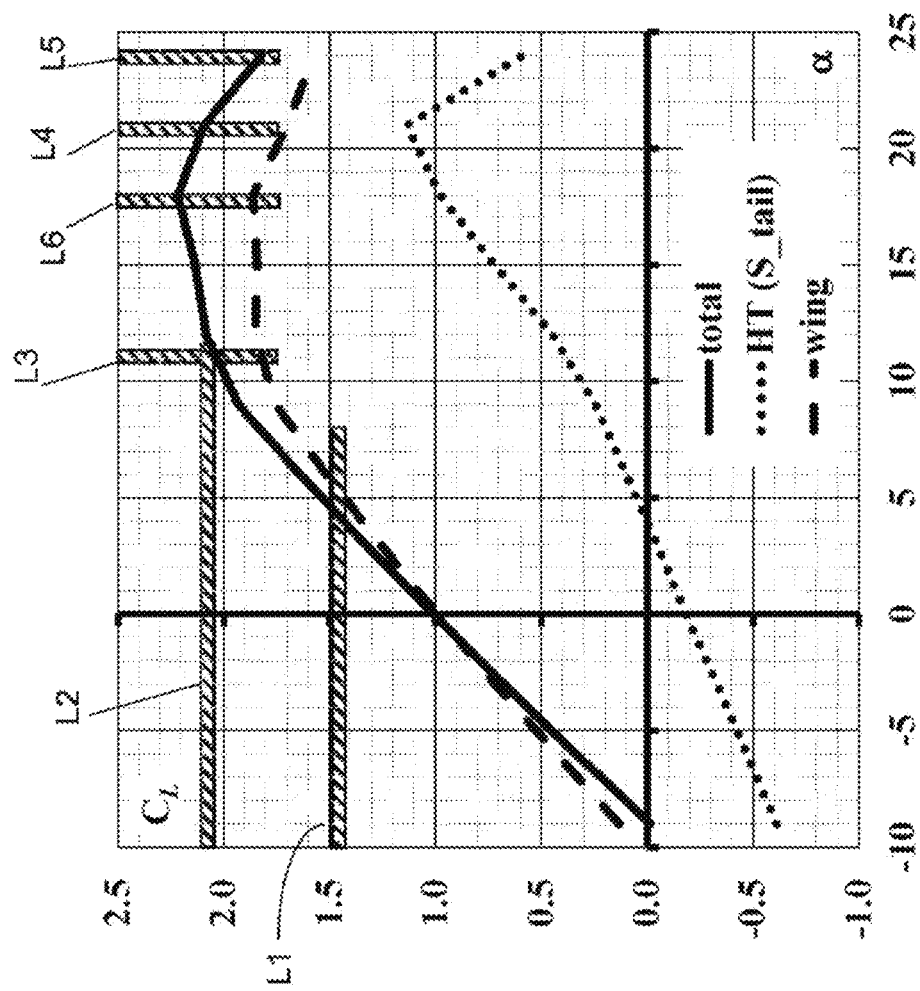
FIG. 9 illustrates a variation of lift coefficient with angle of attack for the air vehicle, a variation of lift coefficient with angle of attack for the three dimensional wing based of the example of the aerofoil of FIG. 5, and a variation of lift coefficient with angle of attack for the tail.

Referring to FIG. 9, lift coefficient characteristics with respect to angle of attack a are compared between the wings 120A, the horizontal stabilizer 186A, and the complete air vehicle 100A. The lift coefficient characteristics of the wings 120A, and of the complete air vehicle 100A are each normalized with respect to the plan area of wings 120A. The lift coefficient characteristics of the horizontal stabilizer 186A are normalized with respect to the plan area of the horizontal stabilizer 186A.

Figure 10:
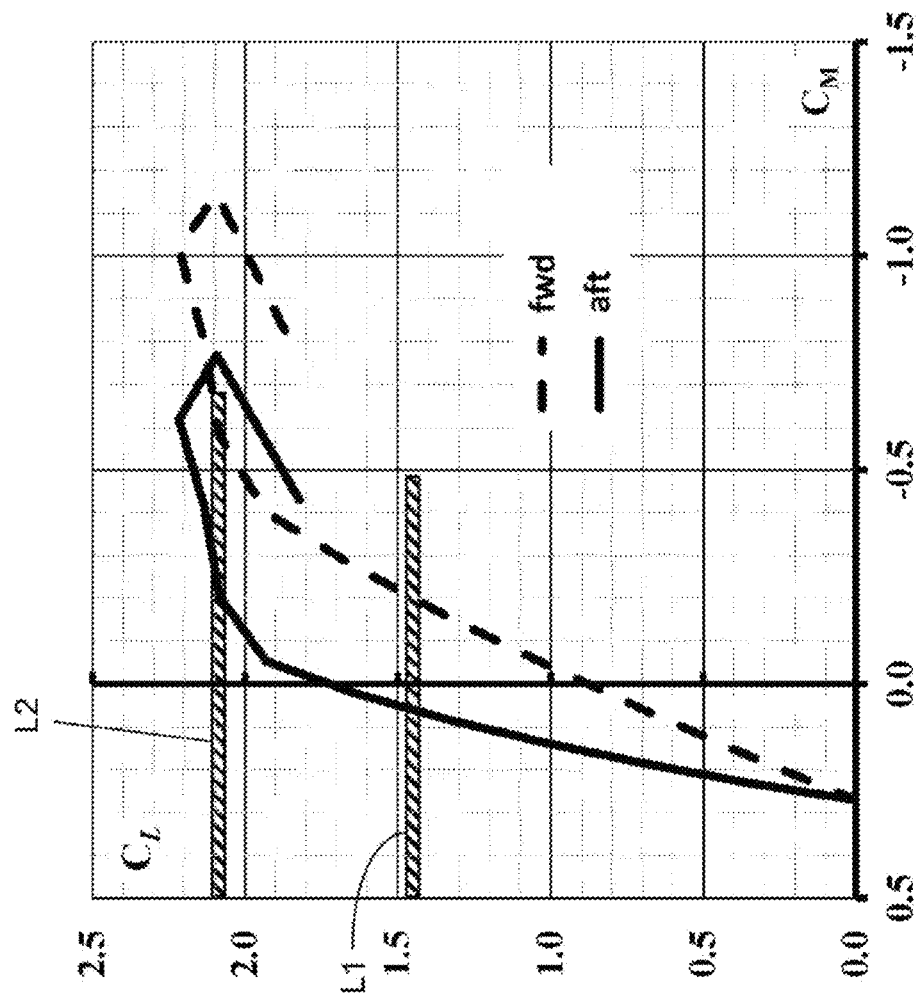
FIG. 10 illustrates a variation of lift coefficient with pitching moment coefficient for the air vehicle of the example of the aerofoil of FIG. 9.

Referring also to FIG. 10, the pitching moment characteristics are shown for air vehicle 100A, as variation of air vehicle lift coefficient CL with pitching moment coefficient CM at the forward and aft limits of the center of gravity CGA. In at least this example, the forward limit of the center of gravity CGA is 30% mean aerodynamic cord, and the aft limit of the center of gravity CGA is 48% mean aerodynamic cord.

It is to be noted that FIG. 10 indicates that when the air vehicle 100A is operated at high angles of attack a, large pitching moments are induced, which in turn require high horizontal stabilizer forces to be generated for trim. Accordingly, according to this aspect of the presently disclosed subject matter, when applying method 1000 to the air vehicle 100 or 100A, the respective horizontal stabilizer is configured for generating significantly higher magnitude pitching moments than is normally required for regular operation of the air vehicle.

In FIGS. 9 and 10, horizontal line L2 represents the estimated maximum coefficient of lift $CL_{max}$ of the air vehicle prior to initiation of wing stall, while horizontal line L1 represents the lift coefficient corresponding to minimum airspeed of the air vehicle with safety margin ($V_{min}=1.2*V_{stall}$) for aerodynamic flight, i.e., at the commencement of forward flight mode FFM. Thus horizontal L2 corresponds to the quotient $C_{Lmax}/1.44$.

In FIG. 9, vertical line L3 represents the angle of attack α corresponding to initiation of wing stall, in at least this example. Vertical line L4 represents the angle of attack a corresponding to aileron stall (of the ailerons in the wings 120A) in at least this example. Vertical line L5 represents the angle of attack α corresponding to horizontal stabilizer stall, in at least this example. Vertical line L6 represents the angle of attack a corresponding to a maximum angle of attack limit prior to aileron stall, thereby providing a safety margin with respect to aileron stall, in at least this example.

Thus, the intersection of line L2 and line L3 provides the maximum lift coefficient and corresponding angle of attack α for aerodynamic flight, while line L1 provides the stall safety margin ($V_{min}=1.2*V_{stall}$) for aerodynamic flight. For at least this example, at line L4 there is aileron stall, and thus the air vehicle cannot be controlled at least in roll, and at line L5 there is horizontal tail stall, and the vehicle cannot be controlled in pitch.

Furthermore, between line L3 and line L4, there is a "plateau" in the lift coefficient, in which the air vehicle is stable and fully controllable. According to an aspect of the presently disclosed subject matter, this "plateau" in the lift coefficient is essentially used for the transient mode TRM; however, such use is limited in at least this example to an angle of attack less than that corresponding to line L4. For example, in at least this example, the maximum angle of attack in transient mode TRM is limited to about 18°, which is less than the angle of attack of 21° corresponding to line L4. As will become clearer herein, the relatively high angles of attack that can be used in transient mode TRM (because of the high lift mild stall characteristics of the wings) also enables a horizontal thrust to be generated by the second propulsion system that is used for braking the air vehicle during transition to hover mode HOM. Furthermore, in view that during transient mode TRM vertical thrust from the second propulsion system is being generated, it is possible to shift operation of the air vehicle from line L1 to line L2 (rendering the lift coefficients between line L1 and line L2 usable), and enabling operation of the air vehicle to continue up to the conditions represented by line L6. The vertical thrust reduces the need for the stall margin.

Figure 15:
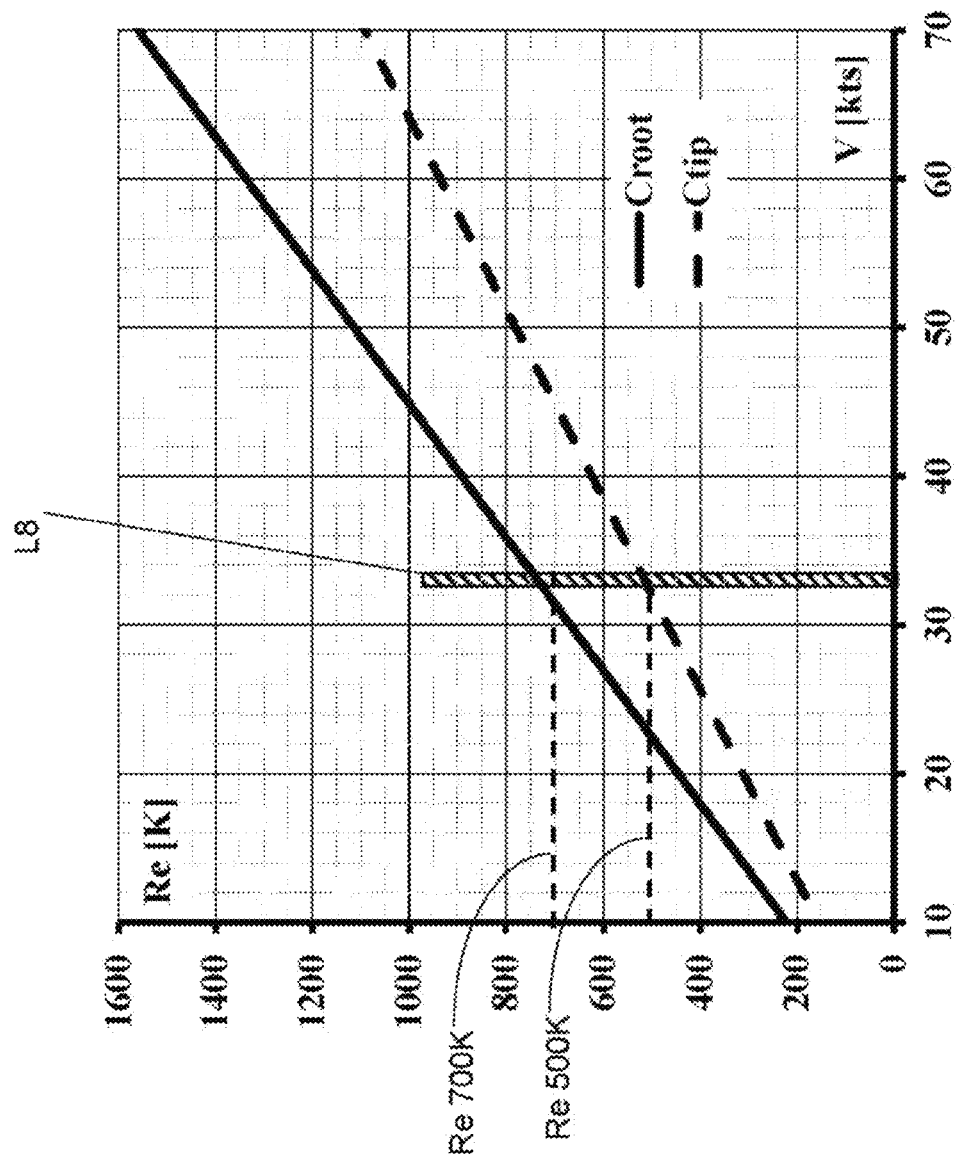
FIG. 15 schematically illustrates a variation of Reynolds number with forward speed obtained for the air vehicle example of FIGS. 3(a) to 3(c).

FIG. 15 shows the variation of Reynolds number Re with forward speed V obtained for the air vehicle 100A, in at least this example. Vertical line L8 represents the aerodynamic stall speed $V_{stall}$. In FIG. 15, the region to the left of line left L8 represents Reynolds numbers in transition mode TRM.

Figure 16:
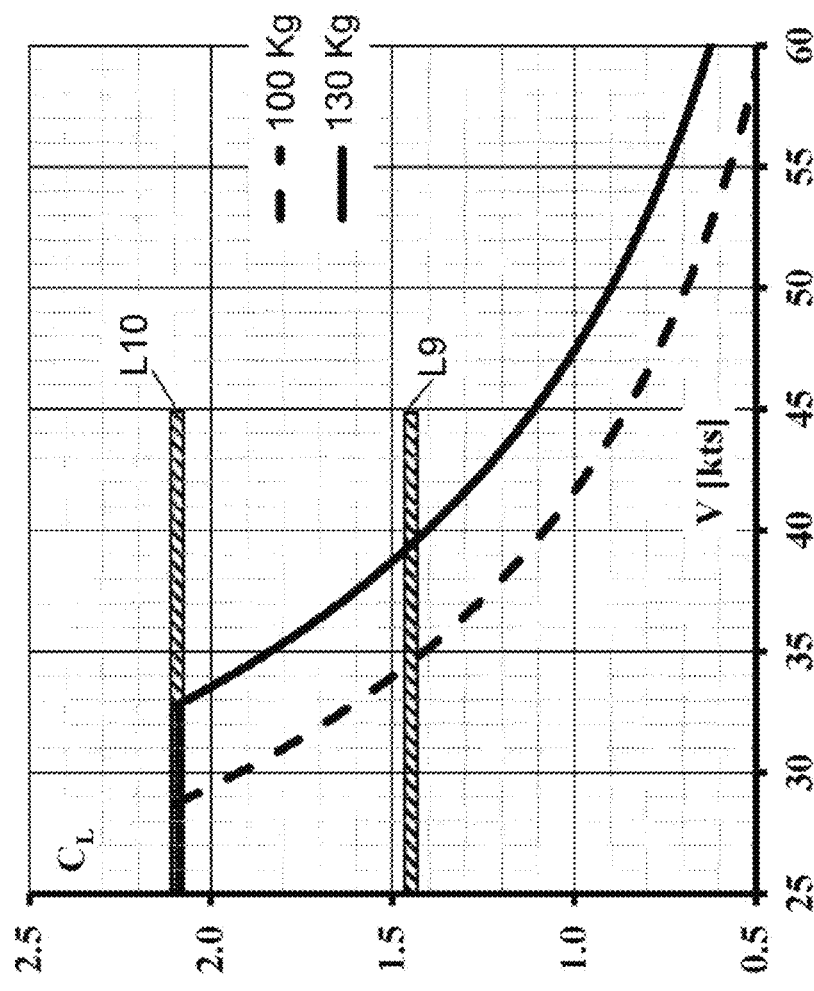
FIG. 16 compares variations of aircraft lift coefficient with forward speed at air vehicle weights 100 Kg and 130 Kg obtained for an example of an implementation of the air vehicle example of FIGS. 3(a) to 3(c).

FIG. 16 shows the variation of aircraft lift coefficient CL with forward speed V at air vehicle weights 100 Kg and 130 Kg obtained for an implementation of the example of the air vehicle 100A. Horizontal lines L9 and L10 correspond to lines L1 and L2, respectively of FIG. 9.

The above results indicate that the design of aerofoil ISAR-20 (corresponding to aerofoil 300), is suitable for integration with high-lift, mild-stall wing, allowing safe operation of an air vehicle, such as for example a UAV, at post-stall angles of attack and as will become clearer below also allows for providing energy-economical transitions between hover mode HOM and forward flight mode FFM via transition mode TRM.

Referring again to FIG. 1, the method 1000 comprises the following general steps:

Step 1200~ providing an operating map 1500 of angle of attack of the air vehicle 100 with forward speed V, including conditions of separated flow over the fixed wings and conditions of attached flow over the fixed wings.

Step 1300~ applying a transitioning maneuver to the air vehicle for transitioning the air vehicle between said hover mode HOM and said forward flight mode FFM via a transition mode TRM, the transitioning maneuver comprising manipulating a first magnitude of angle of attack a of the air vehicle with forward speed V to provide an aerodynamic lift component, and manipulating a second magnitude of said vertical thrust during said transitioning maneuver to provide a vectored thrust component, such that the summation of said aerodynamic lift component and said vectored thrust component is sufficient for enabling said hover mode HOM, forward flight mode FFM, and said transition mode TRM Step 1300 can be of particular significance during certain critical phase in the flight envelope of the air vehicle, for example including transition between vertical vectored thrust and horizontal aerodynamic flight, for example in flight stages of a VTOL or V/STOL or STOVL air vehicle, when taking off vertically or when landing vertically.

Figure 11:
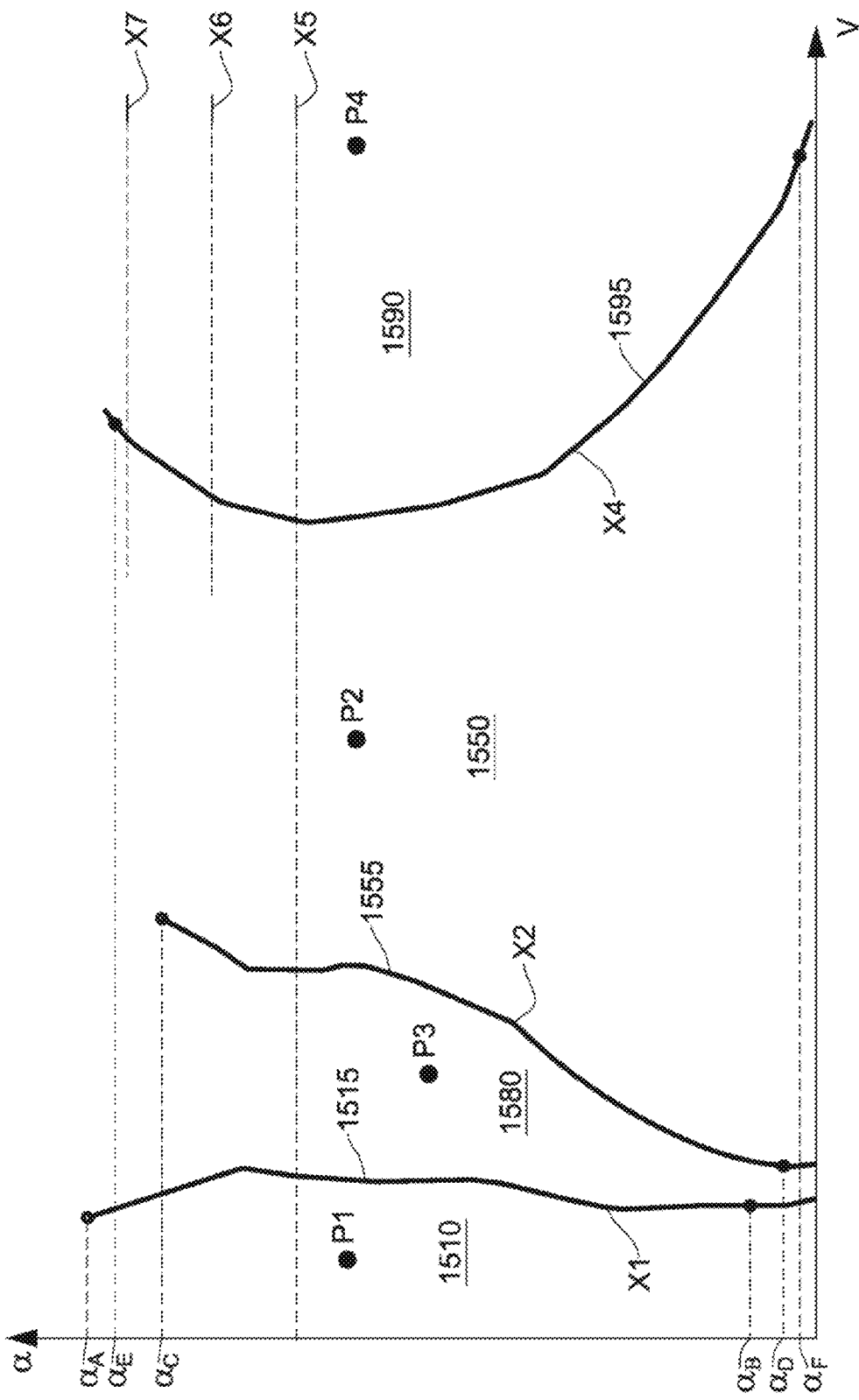
FIG. 11 schematically illustrates an operating map of angle of attack with velocity, according to an example of the presently disclosed subject matter.

FIG. 11 schematically illustrates an example of an operating map 1500 of angle of attack a of the fixed wings of the fixed wing VTOL air vehicle 100, versus forward speed V for the air vehicle, provided in Step 1200.

In this example, the operating map 1500 is essentially a two-dimensional Cartesian representation or other suitable graphical representation having two orthogonal axes, in which one axis (for example the x-axis, for convenience) is the air vehicle forward speed V axis, and the other axis (for example the y-axis, for convenience) is the angle of attack a axis. In alternative variations of this example, other mapping systems or representations can be used, for example a map based on a polar coordinate system.

It is to be noted that when referring to the operating map, the "angle of attack of the fixed wings" can refer to the angle of attack of the air vehicle 100 or 100A.

In at least this example, the angle of attack of the air vehicle 100 or 100A can be considered zero when the longitudinal axis LA or LA1, respectively, is parallel to the freestream direction.

The operating map 1500, and/or one or more transient paths therein, can be provided in physical form, for example printed or otherwise depicted on a paper or on some other suitable substrate. Alternatively, the operating map 1500, and/or one or more transient paths therein (in particular, as these relate to the flight envelope), can be provided in electronic form in the memory or processor of a computer (for example as software including one or more of: a table of values, algorithms, flight control laws, and so on) operatively connected to (or integrally part of) the controller (for example the airborne computer) of the air vehicle 100 to enable the air vehicle 100 to be operated at conditions represented by various regions in the operating map 1500, as will become evident herein.

Referring again to FIG. 11, schematic operating map 1500 comprises a first operating region 1510, a second operating region 1550, a third operating region 1580, and a fourth operating region 1590, provided in step 1200.

The first operating region 1510 in operating map 1500 comprises a plurality of first points P1 therein. Each such first point P1 represents a respective first set (a1, V1) of an angle of attack a1 and a corresponding forward speed V1 at this particular first point P1. Each such first point P1 in the first region 1510 corresponds to conditions of fully separated flow over the fixed wings of the air vehicle or of zero flow over the fixed wings of the air vehicle, irrespective of whether or not the angle of attack a1 and the corresponding forward speed V1 of the respective first point P1 were reached from the third operating region 1580.

The first operating region 1510 also defines a first operating boundary 1515, comprising a first variation X1 of a maximum forward speed limit with angle of attack a, for a range of angle of attack between an upper limit at angle of attack $a_A$ to a lower limit at angle of attack $a_B$. The first operating boundary 1515 thus represents a line of demarcation between the first operating region 1510 and the third operating region 1580.

Herein, and as mentioned above, the respective maximum forward speed limit for a particular angle of attack a is also referred to as the "lift-off" forward speed, being the forward speed at which, for the particular angle of attack, the lift decreases sharply, and at which there is full transition from aerodynamic flight to vectored thrust flight, i.e., to hover mode HOM. Correspondingly, the first variation X1 is also referred to interchangeably herein as the variation of lift-off forward speed with angle of attack.

Thus, for all first points P1 in the first operating region 1510, i.e., at any given angle of attack a between $a_A$ and $a_B$, and for forward speeds at or lower than the forward speed corresponding to the maximum forward speed limit of first variation X1 at the aforesaid given angle of attack, the flow over the fixed wings of the air vehicle is always separated or zero. Such fully separated or zero flow conditions at each first point P1 correspond to conditions of very low or nominally zero aerodynamic lift being generated by the fixed wings, respectively, and are in any case irrespective of and independent of whether the respective angle of attack a1 at the respective first point P1 was reached by arriving at respective angle of attack a1 from a higher angle of attack or from lower angle of attack, and/or, irrespective of and independent of whether the respective forward speed V1 at the respective first point P1 was reached by arriving at respective forward speed V1 from a higher forward speed or from a lower forward speed.

The second operating region 1550 in operating map 1500 comprises a plurality of second points P2 therein. Each such second point P2 represents a respective second set (a2, V2) of an angle of attack a2 and a forward speed V2 at this particular second point P2. Each such second point P2 in the second region 1550 corresponds to conditions of attached flow over the fixed wings of the air vehicle, irrespective of whether or not the respective second point P2 was reached from the third operating region 1580. However, while the flow over the wings are sufficient to generate aerodynamic lift, the level of such aerodynamic lift is not sufficient to maintain straight level flight, i.e., the level of lift at the corresponding forward speed V2 is less than the weight W of the air vehicle.

The second operating region 1550 also defines a second operating boundary 1555, comprising a second variation X2 of a minimum forward speed limit with angle of attack a, for a range of angle of attack between an upper limit at angle of attack $a_C$ to a lower limit at angle of attack $a_D$. The second operating boundary 1555 thus represents a line of demarcation between the second operating region 1550 and the third operating region 1580.

Herein, and as mentioned above, the respective minimum forward speed limit for a particular angle of attack a, corresponding to the second variation X2, is also referred to as the "lift-on" forward speed, being the forward speed at which, for the particular angle of attack, the lift increases sharply, and at which transition from vectored thrust flight to aerodynamic flight commences, i.e., corresponding to the start of transition mode TRM. Correspondingly, the second variation X2 is also referred to interchangeably herein as the variation of lift-on forward speed with angle of attack.

Thus, for all second points P2 in the second operating region 1550, i.e., at any given angle of attack a between $a_C$ and $a_D$, and for forward speed at or greater than the forward speed corresponding to the minimum forward speed limit of second variation X2 at the aforesaid given angle of attack, the flow over the fixed wings of the air vehicle is always attached or partially attached, but as yet insufficient aerodynamic lift is generated to enable straight and level flight. It is to be noted that such attached flow conditions at each second point P2 is irrespective of and independent of whether the respective angle of attack a2 at the respective second point P2 was reached by arriving at respective angle of attack a2 from a higher angle of attack or from lower angle of attack, and/or, irrespective of and independent of whether the respective forward speed V2 at the respective second point P2 was reached by arriving at the respective forward speed V2 from a higher forward speed or from a lower forward speed.

The third operating region 1580 in the operating map 1500 extends between the first operating boundary 1515 and the second operating boundary 1555. In other words, the third operating region 1580 separates the first operating region 1510 from the second operating region 1550. The third operating region 1580 comprises a plurality of third points P3 therein.

Each such third point P3 represents a respective third set (a3, V3) of an angle of attack a3 and a forward speed V3 at this particular third point P3.

Each such third point P3 in the third region 1580 corresponds to conditions of attached flow or to conditions of separated flow over the fixed wings, depending on whether the respective third point P3 was reached from any one of the second points P2 (i.e., from the second region 1550), or whether the respective said third point P3 was reached from any one of the first points P1 (i.e., from the first region 1510), respectively.

The fourth operating region 1590 in operating map 1500 comprises a plurality of fourth points P4 therein. Each such fourth point P4 represents a respective fourth set (a4, V4) of an angle of attack a4 and a forward speed V4 at this particular fourth point P4. Each such fourth point P4 in the fourth region 1590 corresponds to conditions of attached flow over the fixed wings of the air vehicle, such flow being sufficient to generate a level of aerodynamic lift, sufficient for or greater than required to maintain straight level flight, i.e., the level of lift at the corresponding forward speed V4 is equal or greater than the weight W of the air vehicle.

The fourth operating region 1590 also defines a fourth operating boundary 1595, comprising a fourth variation X4 of a minimum forward speed limit with angle of attack a, for a range of angle of attack between an upper limit at angle of attack de to a lower limit at angle of attack ar. The fourth operating boundary 1595 thus represents a line of demarcation between the second operating region 1550 and the fourth operating region 1590.

Thus, for all fourth points P4 in the fourth operating region 1590, i.e., at any given angle of attack a between $a_E$ and $a_T$, and for forward speed at or greater than the forward speed corresponding to the minimum forward speed limit of fourth variation X4 at the aforesaid given angle of attack, the flow over the fixed wings of the air vehicle is always attached, and also sufficient aerodynamic lift is generated to enable straight and level flight. It is to be noted that such attached flow conditions at each fourth point P4 is irrespective of and independent of whether the respective angle of attack a4 at the respective fourth point P4 was reached by arriving at respective angle of attack a4 from a higher angle of attack or from lower angle of attack, and/or, irrespective of and independent of whether the respective forward speed V4 at the respective fourth point P4 was reached by arriving at the respective forward speed V4 from a higher forward speed or from a lower forward speed.

Herein, the respective minimum forward speed limit for a particular angle of attack a, corresponding to the fourth variation X4, is also referred to as the "straight level flight" forward speed, being the forward speed (i.e., the stall speed, without the safety margin) at which, for the particular angle of attack, the lift is just sufficient to maintain straight and level flight, and at which there is full transition from vectored thrust flight to aerodynamic flight, i.e., to forward flight mode FFM.

Furthermore, there is a first upper operating limit X5 regarding angle of attack a corresponding to a maximum angle of attack limit prior to aileron stall, thereby providing a safety margin with respect to aileron stall This upper limit X5 applies at least to the second variation X2, the third variation X3 and the fourth variation X4. In other words, first upper operating limit X5 can represent the angle of attack a corresponding to moderate stall. Additionally, two additional upper operating limits can be provided-second upper operating limit X6 can represent the angle of attack a corresponding to aileron stall (of the ailerons in the wings 120A), and third upper operating limit X7 can represent the angle of attack a corresponding to horizontal tail stall.

Thus, first upper operating limit X5 corresponds to line L6 of FIG. 9; second upper operating limit X6 corresponds to line L4 of FIG. 9; and third upper operating limit X7 corresponds to line L5 of FIG. 9.

Figure 3A:
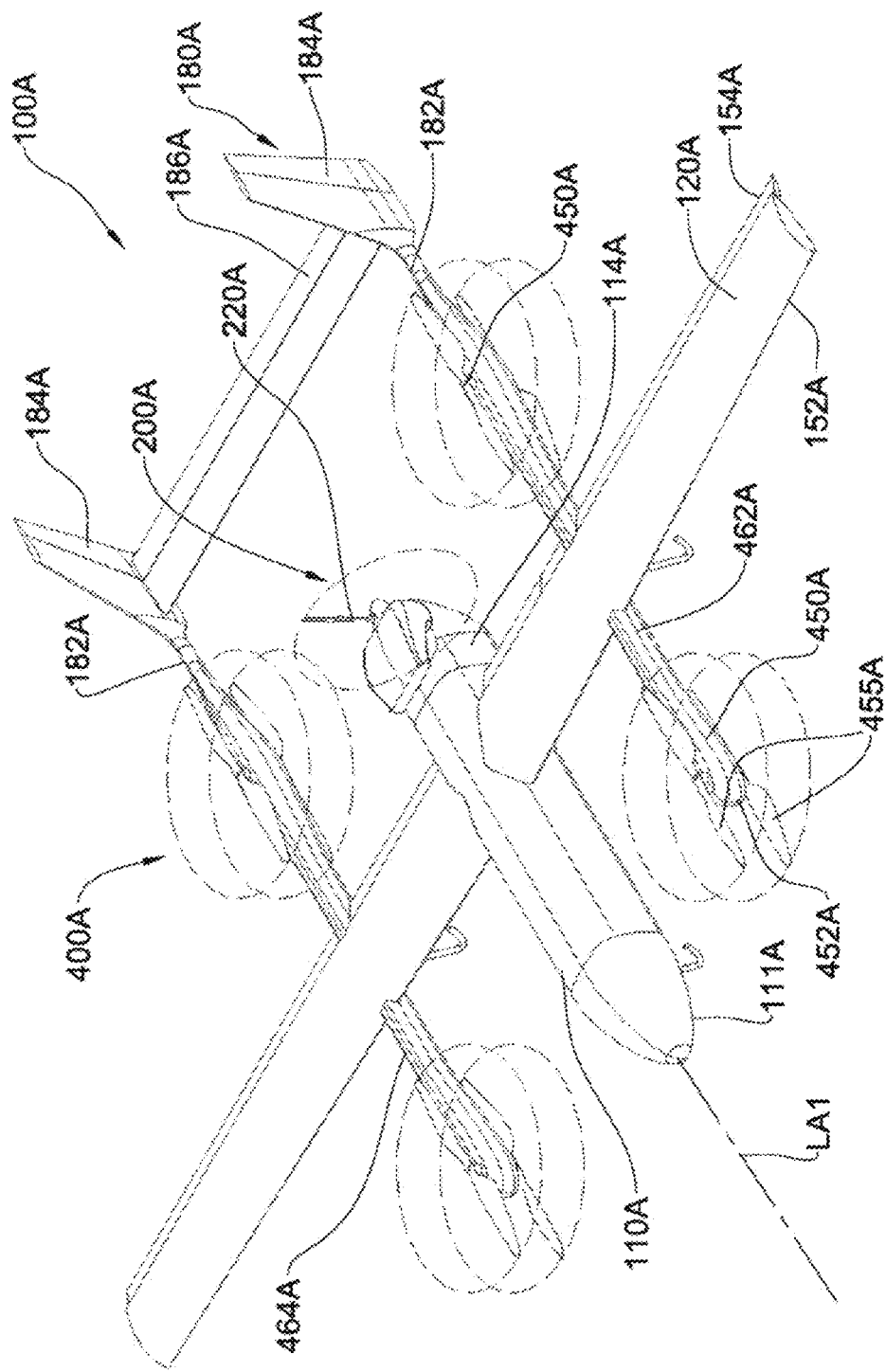
FIG. 3(a) is an isometric view of another example of an air vehicle configured for implementing a method for operating an air vehicle according to an example of the presently disclosed subject matter.
Figure 3C:
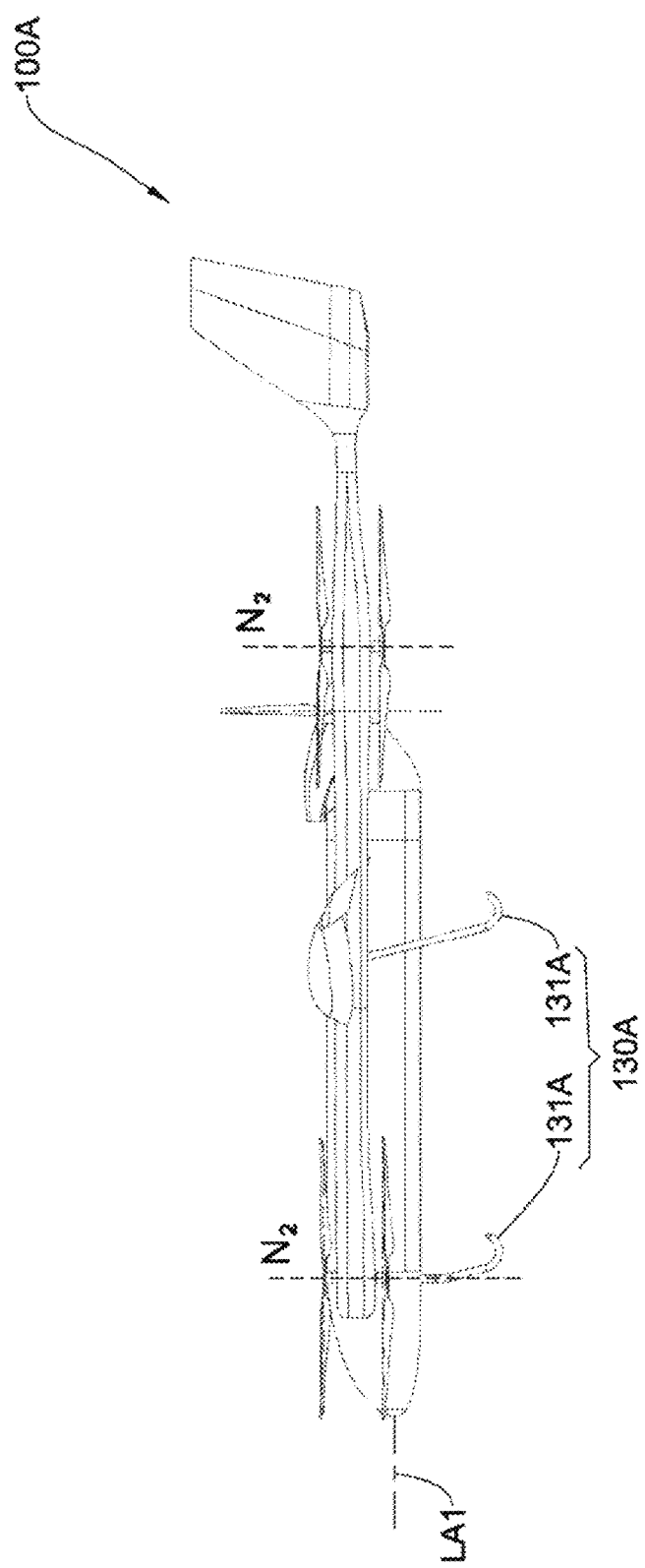
FIG. 3(c) is a side view of the example of FIG. 3(a).
Figure 12:
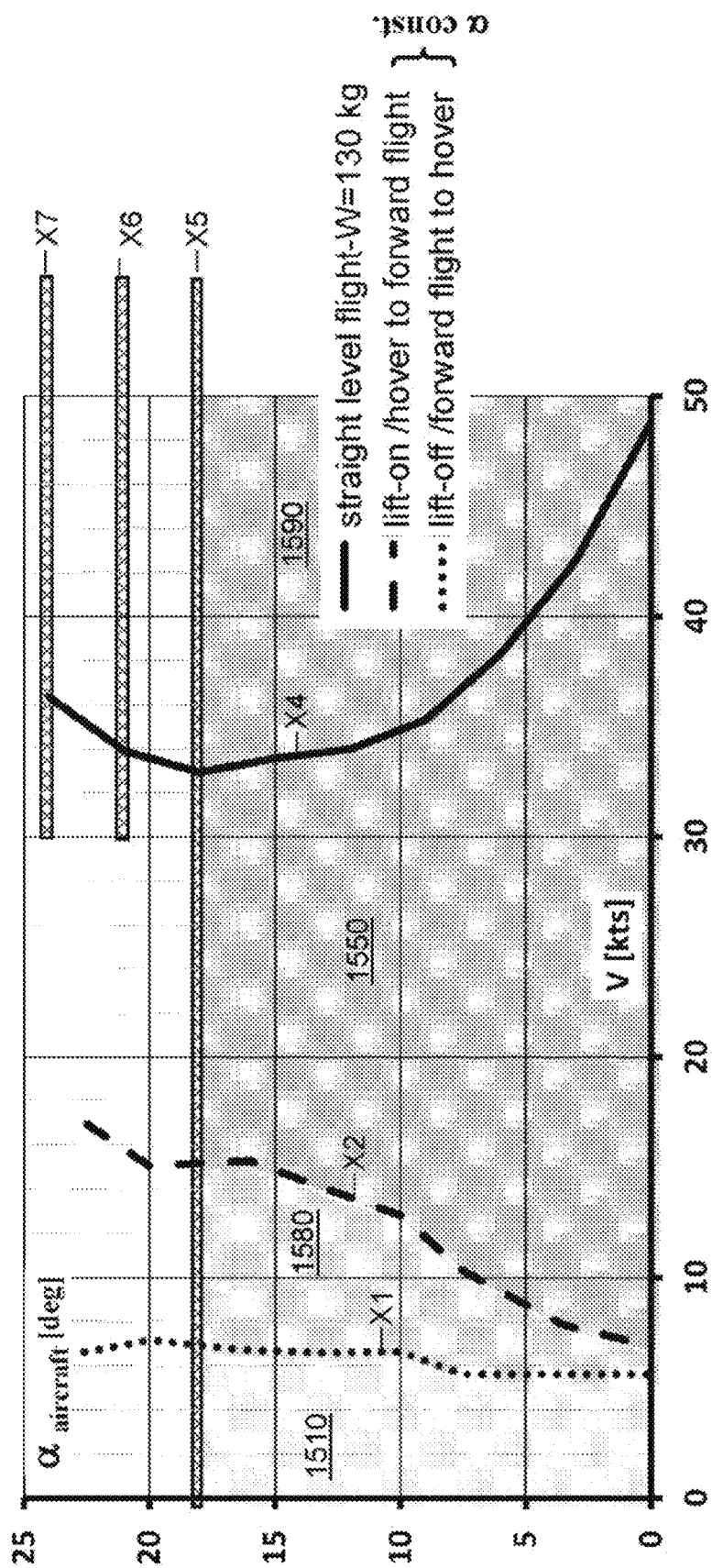
FIG. 12 schematically illustrates the operating map of angle of the example of FIG. 11, annotated with operational limits.

For example, referring to FIG. 12, an operating map 1500A is provided for the air vehicle 100A of FIGS. 3(a) to 3(c). In such an example, such a first upper limit X5 corresponds to a maximum angle of attack max of about 18°. In this example, aileron stall occurs at angle of attack of about 21° corresponding to the respective second upper operating limit X6, and horizontal stabilizer stall occurs at an angle of attack of about 24°, corresponding to the respective third upper operating limit X7.

The corresponding first region 1510 thus represents very low or zero aerodynamic lift generated by the wings 120A and fully vectored thrust flight via the second propulsion system 400A, for all combinations (a1, V1) of forward speed V and angle of attack a in the first region 1510.

The second region 1550 represents conditions of partially attached or fully attached flow over the suction and pressure surfaces of the wings for all combinations of forward speed and angle of attack in the second region 1550, but in which there is insufficient aerodynamic lift generated at such combinations (a2, V2) of forward speed and angles of attack to sustain straight level flight.

The third region 1580 represents "transient" conditions in which for combinations (a3, V3) of forward speed and angle of attack (i.e., at any of the third points P3) in the third region 1580, the flow over the wings can be either fully separated or attached (for example fully attached or partially attached), depending on the starting point of the flight, i.e., the particular starting combination of forward speed and angle of attack from which point P3 is reached. In such conditions, operation of the second propulsion system 400A is required to complement the shortfall in aerodynamic lift generated by the wings.

Figure 13:
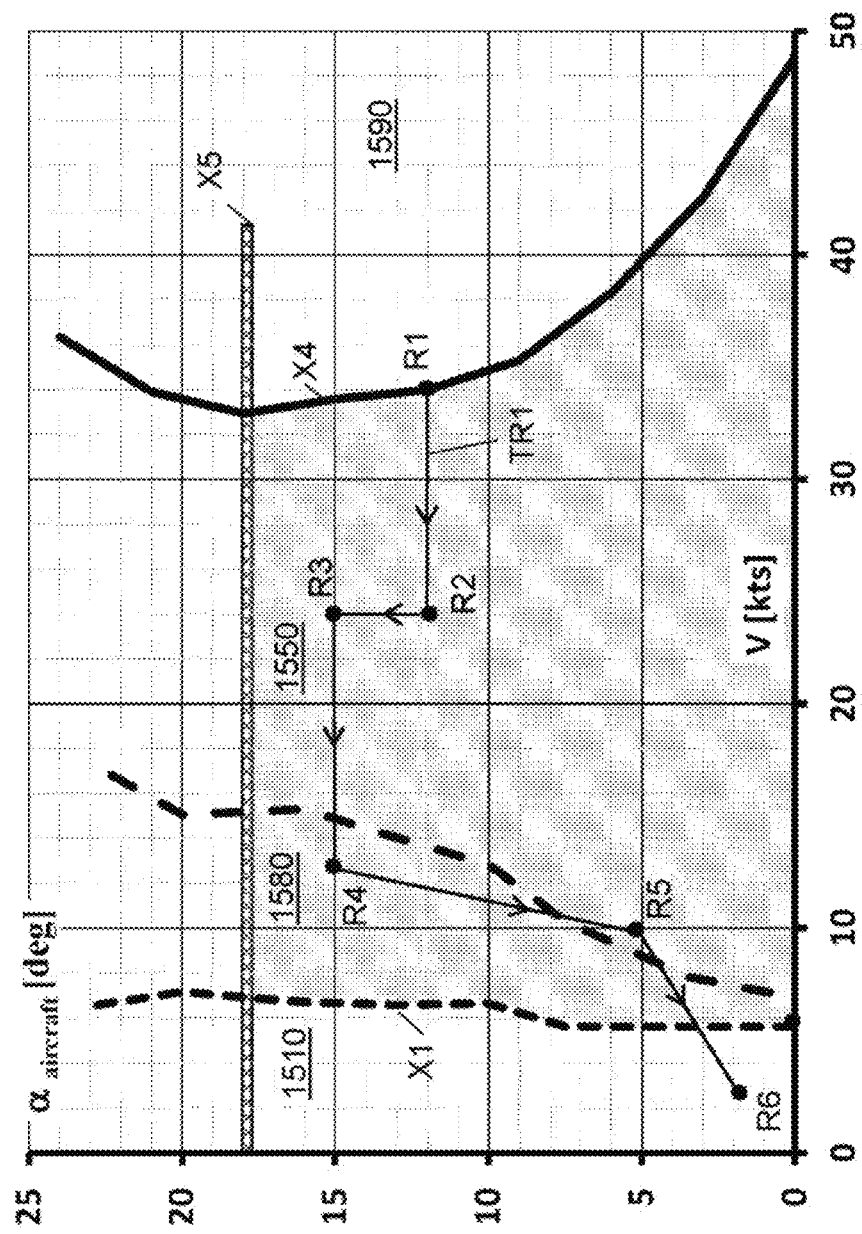
FIG. 13 schematically illustrates the operating map of angle of the example of FIG. 11, annotated with an example of a transient corridor for transitioning from forward flight mode to hover mode.

Thus, and also referring to FIG. 13, when transitioning from the second operating region 1550 to the third operating region 1580 (generally corresponding to a decrease in forward speed for the air vehicle), similar conditions apply in the third operating region 1580 as in the second operating region 1550, and thus the aerodynamic lift generated by the wings steadily declines from nominally 100% of that required for straight and level flight at the corresponding point in the fourth variation X4, to zero at the corresponding point in the first variation X1.

Figure 14:
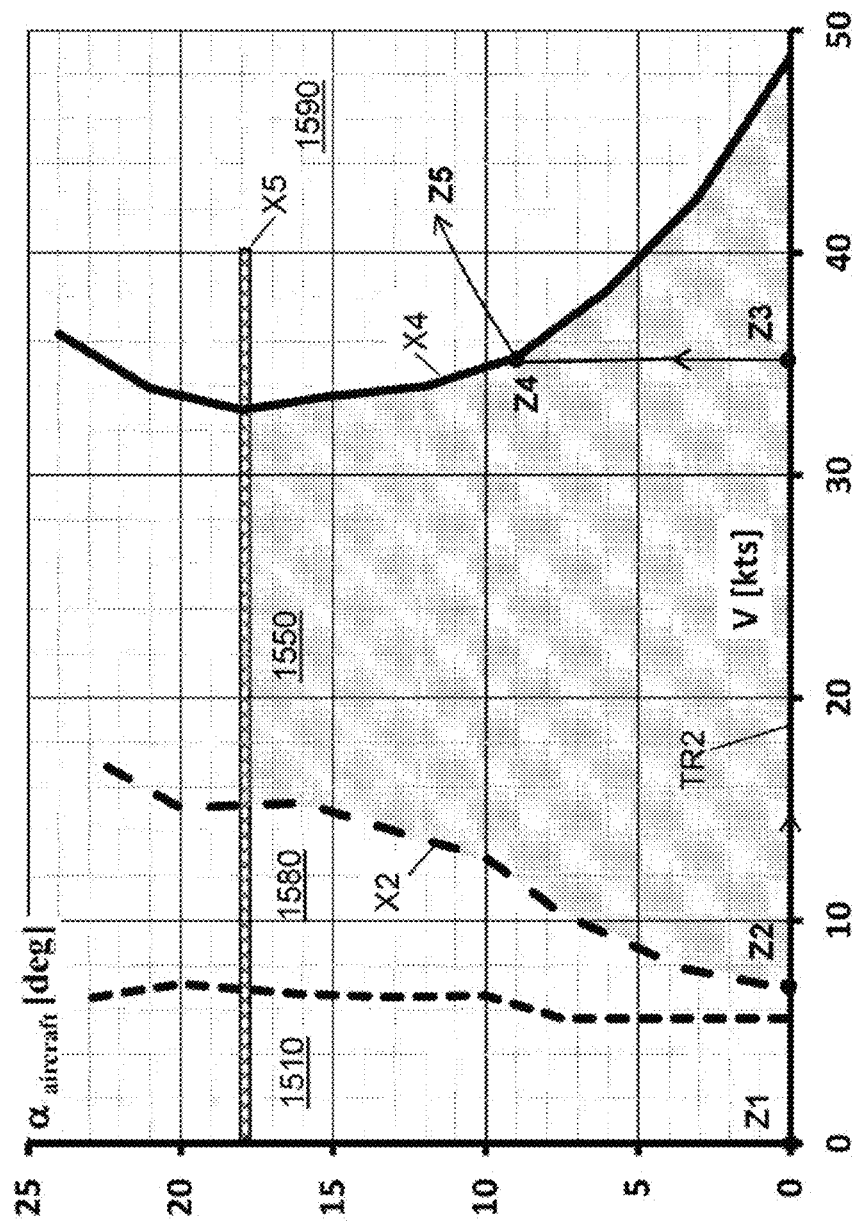
FIG. 14 schematically illustrates the operating map of angle of the example of FIG. 11, annotated with an example of a transient corridor for transitioning from hover mode to forward flight mode.

Conversely, and referring to FIG. 14, when transitioning from the first operating region 1510 to the third operating region 1580 (generally corresponding to an increase in forward speed for the air vehicle) the aerodynamic lift generated by the wings remains at nominally zero until reaching a point on the second variation X2.

The fourth region 1590 represents conditions of fully attached flow over the suction and pressure surfaces of the wings for all combinations of forward speed and angle of attack in the second region 1550, and in which there is sufficient aerodynamic lift generated at such combinations (α, V) of angles of attack and forward speed to sustain straight level flight. In such conditions, operation of the second propulsion system 400A is not required.

Thus, the first region 1510 corresponds to the hover mode HOM, while the fourth region 1590 corresponds to the forward flight mode FFM.

The third operating region 1580 can correspond to part of the hover mode HOM or to part of the transition mode TRM, depending on the direction of the transition. Thus, the third operating region 1580 corresponds to part of the hover mode HOM if the transit is from hover mode HOM to forward flight mode FFM. On the other hand, the third operating region 1580 correspond to part of transition mode TRM if the transit is from forward flight mode FFM to hover mode HOM.

The second region 1550 corresponds to part or all of the transition mode TRM, depending on the direction of the transition. Thus, the second region 1550 corresponds to all of the transition mode TRM if the transit is from hover mode HOM to forward flight mode FFM. On the other hand, the second region 1550 correspond to part of transition mode TRM if the transit is from forward flight mode FFM to hover mode HOM, and together with the third operating region 1580 constitute all of the transition mode TRM in such a case.

According to an aspect of the presently disclosed subject matter, transition from forward flight mode FFM to hover mode HOM is initiated by transitioning from the fourth operating region 1590 to the first operating region 1510 via the second operating region 1550 and third operating region 1580. This is accomplished by reducing forward speed at an angle of attack a corresponding to the stall plateau (i.e., in the angle of attack range of from about 8° to about 18°, preferably in the angle of attack range of from about 11° to about) 18° where the lift coefficient CL of the wing is within up to about 5% of maximum $CL_{max}$.

During such transitioning the wings 120A generate an aerodynamic lift component Lv in a vertical direction, and the second propulsion system 400A is operated to provide a vertical second thrust component $T_{2\nu}$ in an upwards vertical direction. The total vertical force $T_T$ acting on the air vehicle is the summation of the aerodynamic lift component Lv and the vertical second thrust component $T_{2\nu}$, i.e.:

$$T_T = L_V + T_{2V}$$

The total vertical force $T_T$ is sufficient for enabling controlled flight during such transition in the transition mode TRM, as well as fully vectored thrust flight at the hover mode HOM, or fully aerodynamic flight at the forward flight mode FFM. For example, in straight and level flight during such transition, the total vertical force TT is equal to the weight W of the air vehicle.

Furthermore, and referring again to FIG. 13, during such transition, the magnitude of the aerodynamic lift component Lv decreases from a maximum at conditions corresponding to the fourth variation X4, to zero at conditions corresponding to the first variation X1. Concurrently, during such transition, the vertical second thrust component $T_{2\nu}$ increases from zero at conditions corresponding to the fourth variation X4, to a maximum at conditions corresponding to the first variation X1.

Thus, as the air vehicle 100A reduces its forward speed V during such transitioning such that at the start of such transition the forward speed V and concurrent angle of attack a corresponds to a point at the fourth variation X4, the second propulsion system 400A is operated to generate second thrust $T_2$ along the fixed second thrust vector $N_2$. As will become clearer herein, during this transition the magnitude of the aforesaid second thrust $T_2$ varies from zero at conditions corresponding to the fourth variation X4 to a maximum second thrust $T_2$ at conditions corresponding to the first variation X1.

Referring again to FIG. 9, at such angles of attack a corresponding to the stall plateau, the wings generate the aforementioned aerodynamic lift component Lv, the magnitude of which depends on the magnitude of the forward speed and on the lift coefficient $C_L$. At the stall plateau angles of attack a, the coefficient of lift $C_L$ is high and remains fairly constant (for example within about 5% of the maximum lift coefficient), thereby essentially maximizing the magnitude of aerodynamic lift component Lv at any forward speed in the second operating region 1550 or in the third operating region 1580. However, during the above transition in the transition mode TRM as the forward speed V is reduced, the magnitude of the aerodynamic lift component Lv correspondingly diminishes.

Figure 17:
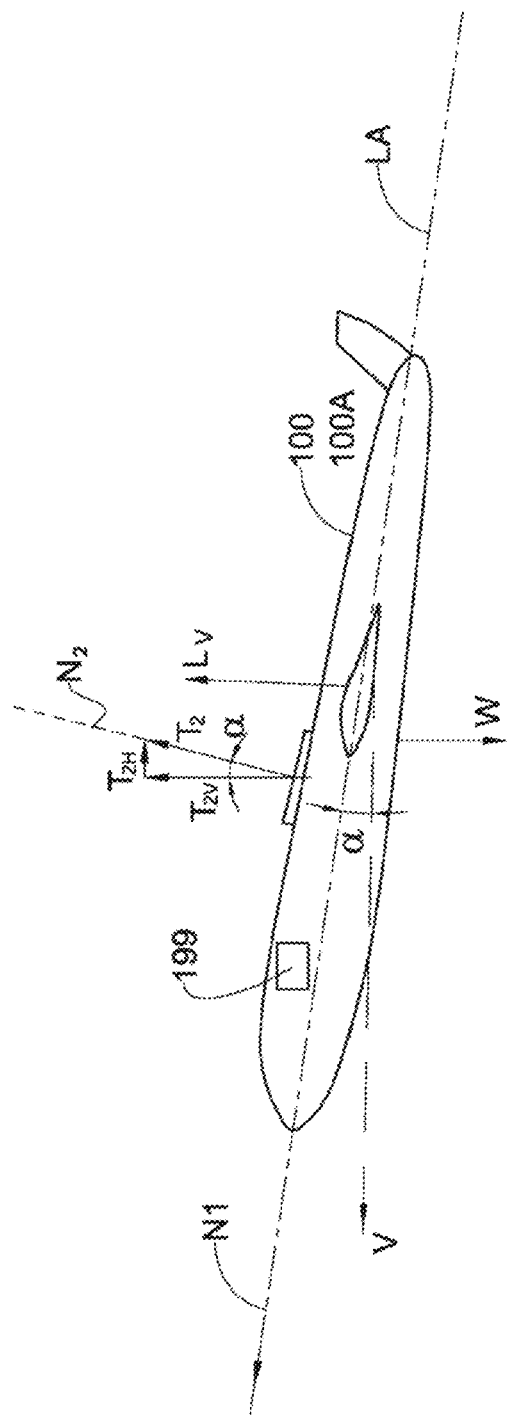
FIG. 17 schematically illustrates force vectors on an example of an air vehicle according to aspects of the presently disclosed subject matter.

Referring to FIG. 17, at such angles of attack a corresponding to the stall plateau, the second thrust vector $N_2$ is inclined to the vertical also by angle α, and thus the total second thrust $T_2$ generated by the second propulsion system 400A along the second thrust vector $N_2$ has a horizontal second thrust component $T_{2H}$ and the aforesaid vertical second thrust component $T_{2\nu}$, as follows:

$$T_{2H} = T_2 * \sin(\alpha)$$
$$T_{2V} = T_2 * \cos(\alpha)$$

The horizontal second thrust component $T_{2H}$ is in an aft direction and aids in decelerating the air vehicle during such transition from the forward flight mode FFM to the hover mode HOM.

During this transition, the magnitude of the vertical second thrust component $T_{2\nu}$ is sufficient to compensate for the shortfall in aerodynamic lift (i.e., the shortfall being equal to the required total vertical force $T_T$ less the actual aerodynamic lift component Lv) generated by the wings 120A in the second operating region 1550 (in cases where straight and level flight continues until hover). According to an aspect of the presently disclosed subject matter, operation of the second propulsion system 400A is controlled (for example via controller 199 (FIG. 17)) such that during this transition the magnitude of the vertical second thrust component $T_{2V}$ is adjusted to compensate for the increasing shortfall in aerodynamic lift Lv generated by the wings in the second operating region 1550 (in cases where straight and level flight continues until hover) as the forward speed V is reduced further.

It is to be noted that for a given magnitude of total second thrust $T_2$ generated by the second propulsion system 400A along the second thrust vector $N_2$, the greater the angle of attack a the greater the magnitude of the corresponding horizontal second thrust component $T_{2H}$.

It is to be noted that one way of increasing the magnitude of the vertical second thrust component $T_{2V}$ during this transition in an anergy efficient way is to decrease the angle of attack a as the forward speed of the air vehicle diminishes because of the cosine dependency. However, it is also to be noted that the corresponding horizontal second thrust component $T_{2H}$ changes (increases) relatively more rapidly as the angle of attack a increases, providing an increasing braking force on the air vehicle, and lowering the time for landing.

Such a braking force is in an aft direction, and according to an aspect of the presently disclosed subject matter such a braking force has a significant braking effect on the forward speed.

For example, the aft braking force is a significant aft braking force, for example having a magnitude that is any one of: at least 10% of the total second thrust $T_2$; at least 14%, or at least 15%, or at least 15.5%, or at least 16.5%, or at least 17.4% of the total second thrust $T_2$; at least 20% of the total second thrust $T_2$; at least 25% of the total second thrust $T_2$.

Thus, increasing the angle of attack in the transition mode TRM reduces the magnitude of the vertical second thrust component $T_{2V}$, which can be compensated for by increasing the magnitude of total second thrust $T_2$ generated by the second propulsion system 400A along the second thrust vector $N_2$. This in turn has a double effect in increasing the magnitude horizontal second thrust component $T_{2H}$—the horizontal second thrust component $T_{2H}$ increases because of the cosine dependency on a larger angle of attack, and also in view of the increase in the magnitude of total second thrust $T_2$ generated by the second propulsion system 400A.

Referring again also to FIG. 17 at large angles of attack a corresponding to the stall plateau, since the second thrust vector $N_2$ is also at angle $\alpha$ to the vertical, the rotors 455A of the second propulsion system 400A are exposed to the forward atmospheric airflow, part of which essentially impinges the rotors 455A such as to aid rotation thereof about their respective rotor axes, thereby reducing the power requirement from the second propulsion system 400A. This effect is referred to herein as the "impingement effect".

Thus at large angles of attack a corresponding to the stall plateau, the fixed vector second propulsion system 400A can provide a significant braking effect on the forward speed V, in an energy efficient manner (aided by the aforementioned impingement effect) for a relatively small difference between the magnitude of the total second thrust $T_2$ and the magnitude of the vertical second thrust component $T_{2V}$.

Such a braking effect can be significant and include providing an aft braking force during said transition. For example, said aft braking force has a magnitude that is at least 14%, or at least 15%, or at least 15.5%, or at least 16.5%, or at least 17.4% of the second thrust.

A consequence of providing such large angles of attack a corresponding to the stall plateau when operating the fixed vector second propulsion system 400A in the transition mode TRM (from the forward flight mode FFM to the hover mode HOM) is that a landing procedure using such transition can be greatly reduced in terms of time between the forward flight mode FFM and the hover mode HOM, followed by landing. Without being bound to theory, inventors consider that the significant magnitude of the horizontal second thrust component $T_{2H}$ generated at such large angles of attack a provides a very significant braking effect on the air vehicle, decelerating the air vehicle much more rapidly than at lower angles of attack (for example less than 11°). In turn, requiring less time to transit from the forward flight mode FFM to landed suggests that the fixed vector second propulsion system 400A is required to operate for a relatively shorter time, which in turn provides for a relatively lower energy requirement. The relatively lower energy requirement can in turn enable smaller batteries to be used as compared with a datum case in which the air vehicle is operated at relatively lower angles of attack, which in turn can also result in less weight for the batteries. Furthermore, the contribution of the actual aerodynamic lift component Lv generated by the wings 120A during the transition mode TRM can also reduce the energy and weight requirements for the batteries.

Such a braking effect can include providing an aft braking force during said transition. For example, said aft braking force has a magnitude that is at least 14%, or at least 15%, or at least 15.5%, or at least 16.5%, or at least 17.4% of the second thrust.

Referring again to FIG. 13, an example of a transient path TR1 from forward flight mode FFM to hover mode HOM via transition mode TRM includes a starting first point R1 on the fourth variation X4, in which the forward speed for the air vehicle 100A is about 34 knots and angle of attack a is 12°, the weight of the air vehicle 100A in this example being about 130 kg. At first point R1, the wings 120A generate 130 Kgf of aerodynamic lift thereby sustaining straight and level flight, and the second propulsion system 400A is generating essentially zero thrust.

As forward speed V is reduced to 24 knots (concurrently maintaining angle of attack a at) 12° to second point R2 in transient path TR1, the aerodynamic lift component Lv reduces from 130 Kgf to 64.8 kgf, while concurrently the second propulsion system 400A is operated so that at this angle of attack a the vertical second thrust component $T_{2V}$ increases from zero to 65.2 Kgf, so that the total vertical force $T_T$ acting on the air vehicle 100A is still 130 kgf, balancing the weight W of the air vehicle 100A. At the second point R2, the horizontal second thrust component $T_{2H}$ is about 13.9 Kgf in an aft direction.

At this point R2, the forward speed V is maintained constant at 24 knots while the angle of attack a is increased to 15° at third point R3, such that the aerodynamic lift component Lv remains approximately constant at 64.8 Kgf, since the coefficient of lift $C_L$ is about constant in the stall plateau (FIG. 9). However, the increased angle of attack a requires the second propulsion system 400A to be operated to increase the total second thrust $T_2$ so that the vertical second thrust component $T_{2V}$ remains at 65.2 Kgf. Concurrently at the third point R3, the horizontal second thrust component $T_{2H}$ increases to about 17.5 Kgf in the aft direction thereby aiding to decelerate the air vehicle further.

After the third point R3, the angle of attack is maintained at 15° while the forward speed reduces to about 14 knots at fourth point R4, reducing the aerodynamic lift component Lv to about 20.5 Kgf, and concurrently the second propulsion system 400A is operated so that at this angle of attack a the vertical second thrust component $T_{2V}$ increases from 65.2 Kgf to 109.5 Kgf, so that the total vertical force $T_T$ acting on the air vehicle 100A is still 130 kgf, balancing the weight W of the air vehicle 100A. At the fourth point R4, the horizontal second thrust component $T_{2H}$ is now about 29.3 Kgf in an aft direction thereby further aiding to decelerate the air vehicle.

Thus, as the air vehicle operates from point R2 to point R3, the angle of attack a is increased at constant forward speed, but the aerodynamic lift component Lv remains approximately constant in view of the stall plateau. However, the "sine" effect of the increased angle of attack in reducing the vertical second thrust component $T_{2V}$ is compensated for by increasing the total second thrust $T_2$, and the combination of the corresponding "cosine" effect and increased total second thrust $T_2$, serve to significantly increase the horizontal second thrust component $T_{2H}$ in an aft direction, thereby providing a significant braking effect to the air vehicle. It is to be noted that in alternative variations of this example, the transition from point R2 to point R3 can be accompanied by a reduction in forward speed, for example, and thus the aerodynamic lift component Lv reduces from point R2 to point R3; in such cases, the vertical second thrust component $T_{2V}$ is increased so that the total vertical force $T_T$ acting on the air vehicle 100A is still 130 kgf, balancing the weight W of the air vehicle 100A.

Such a braking effect can include providing an aft braking force during said transition. For example, said aft braking force has a magnitude that is at least 14%, or at least 15%, or at least 15.5%, or at least 16.5%, or at least 17.4% of the second thrust.

For example, as angle of attack a increases from 10° to 15° in an example of such a transition from point R2 to point R3, the horizontal second thrust component $T_{2H}$ increases from 17.4% to 25.9% of total second thrust $T_2$, a net increase of 8.5% of total second thrust $T_2$ (implementing the aforesaid relationship $T_{2H}=T_2*\sin(a)$). Such a significant proportion of the total second thrust $T_2$ provides for rapid deceleration of the air vehicle.

Concurrently, as angle of attack a increases from 10° to 15° in the same example of such a transition from point R2 to point R3, the vertical second thrust component $T_{2V}$ decreases from 98.5% to 96.6% of total second thrust $T_2$, a net decrease of 1.9% of total second thrust $T_2$ (implementing the aforesaid relationship $T_{2H}=T_2*\cos(a)$).

Thus, in such an example, an increase in braking force in the aft direction of 8.5% of total second thrust $T_2$ comes at a cost of a decrease in 1.9% in vertical thrust.

The transient path TR1 continues from fourth point R4 to fifth point R5, by concurrently reducing the forward speed V to about 10 knots and reducing the angle of attack a to about 5°. At fifth point R5 the aerodynamic lift component Lv has reduced to about 8.15 Kgf, and concurrently the second propulsion system 400A is operated to further increase the second thrust $T_2$ so that at this angle of attack a the vertical second thrust component $T_{2V}$ increases from to 121.9 Kgf, so that the total vertical force $T_T$ acting on the air vehicle 100A is still 130 kgf, balancing the weight W of the air vehicle 100A. At the fifth point R5, the horizontal second thrust component $T_{2H}$ is now reduced to about 10.7 Kgf in an aft direction due to the smaller magnitude of the angle of attack a.

The transient path TR1 ends in the first region 1510 in hover mode HOM as the forward speed V and/or angle of attack a are reduced further to combinations corresponding to the first variation X1, whereupon the wings no longer generate any lift, and the second propulsion system 400A provides all the vertical thrust required for vectored flight.

After this point the air vehicle can land by reducing the magnitude of the second thrust $T_2$.

It is to be noted that in alternative variations of this example, the transition from point R2 to point R3, and/or from point R1 to point R2, can be accompanied by a reduction in forward speed and/or change in angle of attack a, for example, and thus the aerodynamic lift component Lv reduces from point R1 to point R2, and/or from point R2 to point R3; in such cases, the vertical second thrust component $T_{2V}$ is increased so that the total vertical force $T_T$ acting on the air vehicle 100A is still 130 kgf, balancing the weight W of the air vehicle 100A.

Referring again to FIG. 14, an example of a transient path TR2 from hover mode HOM to forward flight mode FFM via the respective transition mode TRM includes a starting first point Z1 in the first operating zone 1510, for example wherein the forward speed V is zero and concurrently the angle of attack a is also zero. The forward speed V is increased while keeping angle of attack a at zero, until the air vehicle reaches conditions corresponding to the second variation X2 at second point Z2. In alternative variations of this example, the angle of attack a is maintained at less than about 5°, for example between about 2° and about zero. In yet other alternative variations of this example, the angle of attack a can have a negative value up to second point Z2.

At second point Z2, the forward speed for the air vehicle 100A is about 8 knots and angle of attack a is 0°, the weight of the air vehicle 100A in this example also being about 130 kg; at this first point Z1, the second propulsion system 400A is generating essentially 130 kgf thrust thereby sustaining straight and level flight or hover, and, the wings 120A generate zero aerodynamic lift. At the second point Z2, the wings are generating a modest lift, and thus the second propulsion system 400A is generating essentially close to maximum thrust thereby sustaining straight and level flight.

As the vehicle 100 transits from point Z2 to point Z3, the forward speed of the air vehicle 100 increase progressively to about 35 knots, and the wings concurrently generate more and more lift, requiring less contribution of vertical thrust from the second propulsion system 400A. Thus, at point Z3, the wings are generating 66 kgf lift and the second propulsion system 400A generates 64 kgf vertical thrust, together supporting the weight W (130 kg in this example) of the air vehicle.

After point Z3, the angle of attack is rapidly increased to the corresponding value provided by the fourth variation X4 at the velocity corresponding to point Z3, for example an angle of attack of 9°, while concurrently the forward speed is maintained constant. The aerodynamic lift generated by the wings of the air vehicle rapidly increases to 130 kgf required for forward flight mode FFM at the aforementioned angle of attack, while the vertical thrust provided by the second propulsion system 400A diminishes pro rata to zero at point Z4.

After point Z4 the air vehicle can be operated at conditions in forward flight mode FFM, for example point Z5.

The aforesaid transient path TR2, by maintaining zero angle of attack a through a majority of the transition mode TRM, including the initial portion thereof where the thrust contribution of the second propulsion system 400A is highest, results in zero magnitude for the horizontal second thrust component $T_{2H}$, and thus avoids generating such a force in an aft direction during transition from hover mode HOM to forward flight mode FFM.

Accordingly, the air vehicle can accelerate rapidly from point Z1 to point Z3 in the absence of such an aft horizontal second thrust component $T_{2H}$ that would otherwise operate to reduce such an acceleration. After point Z3, the contribution of total second thrust $T_2$ to provide the total upward force to the air vehicle is relatively small, as compared with Z1 or Z2, for example, and thus from point Z3 to point Z4, even though there is a horizontal second thrust component $T_{2H}$ in the aft direction acting against the acceleration of the air vehicle, the magnitude of the horizontal second thrust component $T_{2H}$ is relatively small.

Such a transient path TR2 can thus also provide an energy efficient method for transiting from hover mode HOM (or from a take-off position on a surface) to forward flight mode FFM via transition mode TRM for an air vehicle having such a fixed vector second propulsion system.

It is to be noted that the second propulsion system 400A can be further utilized to increase acceleration from hover mode HOM to forward flight mode FFM via transition mode TRM, by providing a negative angle of attack a. This in turn results in horizontal second thrust component $T_{2H}$ being generated, but in a forward direction, thereby aiding acceleration to forward flight mode FFM.

It is to be noted that in alternative variations of this example, point Z4 can be at a different location on the fourth variation X4, and/or the point Z4 can be reached by increasing the angle of attack and concurrently increasing forward speed.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A method for transitioning an air vehicle from a forward speed mode to a hover mode via a transition mode, the method comprising:
   (a) providing the air vehicle, wherein the air vehicle is a VTOL-type fixed wing air vehicle, comprising a first propulsion system, a second propulsion system and a fixed wing arrangement, wherein:
     said first propulsion system is configured for providing a first thrust to the air vehicle at a first thrust vector, the first thrust being sufficient for enabling powered aerodynamic flight to the air vehicle at least in said forward speed mode;
     said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transition mode; and
     said fixed wing arrangement comprises high lift, mild stall wings;
   (b) causing the air vehicle to follow a transient path in said transition mode from said forward speed mode to said hover mode, wherein said transient path comprises manipulating a first magnitude of angle of attack of the air vehicle and a second magnitude of forward speed of the air vehicle during said transition mode to provide a corresponding aerodynamic lift component, and concurrently manipulating a third magnitude of said second thrust during said transition mode to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero, and wherein a stall plateau of the high lift, mild stall wings enables said step of manipulating the first magnitude of angle of attack of the air vehicle and the second magnitude of forward speed of the air vehicle to provide said first magnitude of angle of attack corresponding to a high angle of attack, thereby enabling the spatially fixed second thrust vector to provide an aft braking force during said transition mode.

2. The method according to claim 1, wherein said aft braking force has a magnitude that is at least 14% of the second thrust.

3. The method according to claim 1, wherein said second thrust vector is generally orthogonal with respect to said first thrust vector.

4. The method according to claim 1, including one of the following:
   wherein said step of manipulating the first magnitude of angle of attack of the air vehicle and the second magnitude of forward speed of the air vehicle comprises reducing said second magnitude of forward speed of the air vehicle from a maximum forward speed to a minimum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero; or
   wherein said step of manipulating the first magnitude of angle of attack of the air vehicle and the second magnitude of forward speed of the air vehicle comprises reducing said second magnitude of forward speed of the air vehicle from a maximum forward speed to a minimum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero, and, wherein said maximum forward speed corresponds to a minimum forward speed limit with angle of attack for the air vehicle in which the air vehicle can operate in forward speed mode.

5. The method according to claim 1, including one of the following:
   comprising providing a first upper operating limit regarding said first magnitude of said angle of attack corresponding to a first maximum angle of attack limit prior to aileron stall of ailerons associated with said fixed wing arrangement; or
   comprising providing a first upper operating limit regarding said first magnitude of said angle of attack corresponding to a first maximum angle of attack limit prior to aileron stall of ailerons associated with said fixed wing arrangement, and, wherein said first upper operating limit corresponds to said first magnitude of said angle of attack being about 18°.

6. The method according to claim 1, further comprising providing a first upper operating limit regarding said first magnitude of said angle of attack corresponding to a second upper operating limit corresponding to a second maximum angle of attack limit at aileron stall of ailerons associated with said fixed wing arrangement.

7. The method according to claim 1, wherein the air vehicle comprises a horizontal tail, and wherein the method comprises providing a third upper operating limit regarding said first magnitude of said angle of attack corresponding to a third upper operating limit corresponding to a third maximum angle of attack limit corresponding to horizontal tail stall of said horizontal tail.

8. The method according to claim 1, further comprising one of the following:
reducing said forward speed from said maximum forward speed to a first intermediate forward speed greater than said minimum forward speed, and concurrently maintaining said first magnitude of angle of attack at greater than about 10°;
reducing said forward speed from said maximum forward speed to a first intermediate forward speed greater than said minimum forward speed, and concurrently maintaining said first magnitude of angle of attack at greater than about 10°, and, concurrently maintaining said first magnitude of angle of attack between about 12° and about 15°;
reducing said forward speed from said maximum forward speed to a first intermediate forward speed greater than said minimum forward speed, and concurrently maintaining said first magnitude of angle of attack at greater than about 10°, and, reducing said forward speed from said first intermediate forward speed to said minimum forward speed, and concurrently reducing said first magnitude of angle of attack to less than about 5°; or
reducing said forward speed from said maximum forward speed to a first intermediate forward speed greater than said minimum forward speed, and concurrently maintaining said first magnitude of angle of attack at greater than about 10°, and, concurrently maintaining said first magnitude of angle of attack between about 12° and about 15°, and, reducing said forward speed from said first intermediate forward speed to said minimum forward speed, and concurrently reducing said first magnitude of angle of attack to less than about 5°.

9. The method according to claim 1, including one of the following:
wherein second thrust vector is inclined to an imaginary vertical line at an angle corresponding to or correlated with the angle of attack, thereby providing a horizontal vectored thrust component associated with the respective said vertical vectored thrust component; or
wherein second thrust vector is inclined to an imaginary vertical line at an angle corresponding to or correlated with the angle of attack, thereby providing a horizontal vectored thrust component associated with the respective said vertical vectored thrust component, and, wherein said horizontal thrust vector is in an aft direction opposed to the direction of motion of the air vehicle.

10. The method according to claim 1, wherein said second propulsion system comprises a plurality of rotors exposed to a forward atmospheric airflow at least during said transition mode, and wherein at said first magnitude of angle of attack at least part of the forward atmospheric airflow impinges the rotors such as to aid rotation thereof about their respective rotor axes.

11. A method for transitioning an air vehicle between a forward speed mode and a hover mode via a transition mode, the method comprising:
(a) providing the air vehicle, wherein the air vehicle is a VTOL-type fixed wing air vehicle, comprising a first propulsion system, a second propulsion system and a fixed wing arrangement, wherein:
said first propulsion system is configured for providing a first thrust to the air vehicle at a first thrust vector, the first thrust being sufficient for enabling powered aerodynamic flight to the air vehicle at least in said forward speed mode;
said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transition mode; and
said fixed wing arrangement comprises high lift, mild stall wings;
(b) causing the air vehicle to follow a transient path in said transition mode between said forward speed mode and said hover mode, wherein said transient path comprises manipulating a first magnitude of angle of attack of the air vehicle and a second magnitude of forward speed of the air vehicle during said transition mode to provide a corresponding aerodynamic lift component, and concurrently manipulating a third magnitude of said second thrust during said transition mode to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero.

12. The method according to claim 11, comprising transitioning the air vehicle from said forward speed mode to said hover mode via said transition mode.

13. The method according to claim 12, comprising providing a suitable said first fixed spatial position and further comprising manipulating said first magnitude of angle of attack such as to provide an aft braking force during said transition.

14. The method according to claim 11, further comprising one of the following:
transitioning the air vehicle from said hover mode to said forward speed mode via said transition mode;
transitioning the air vehicle from said hover mode to said forward speed mode via said transition mode, and, wherein said step of manipulating the first magnitude of angle of attack of the air vehicle and the second magnitude of forward speed of the air vehicle comprises increasing said second magnitude of forward speed of the air vehicle from a minimum forward speed to a maximum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero; or transitioning the air vehicle from said hover mode to said forward speed mode via said transition mode, and, wherein said step of manipulating the first magnitude of angle of attack of the air vehicle and the second magnitude of forward speed of the air vehicle comprises increasing said second magnitude of forward speed of the air vehicle from a minimum forward speed to a maximum forward speed, wherein said maximum speed at corresponding said first magnitude of angle of attack of the air vehicle is just sufficient to provide the air vehicle with aerodynamic powered flight concurrent with said third magnitude of said second thrust being zero, and wherein said minimum speed is nominally zero, and, wherein said maximum forward speed corresponds to a minimum forward speed limit with angle of attack for the air vehicle in which the air vehicle can operate in forward speed mode.

15. The method according to claim 14, further comprising one of the following:
increasing said forward speed from said minimum forward speed to a first intermediate forward speed less than said maximum forward speed, and concurrently maintaining said first magnitude of angle of attack at less than about 5°;
increasing said forward speed from said minimum forward speed to said first intermediate forward speed, and concurrently maintaining said first magnitude of angle of attack between about 2° and about 0°;
increasing said forward speed from said minimum forward speed to said first intermediate forward speed, and concurrently providing a negative value for said first magnitude of angle of attack;
increasing said forward speed from said minimum forward speed to a first intermediate forward speed less than said maximum forward speed, and concurrently maintaining said first magnitude of angle of attack at less than about 5°, and, increasing said forward speed from said first intermediate forward speed to said maximum forward speed, and concurrently increasing said first magnitude of angle of attack to more than about 5°; or
increasing said forward speed from said minimum forward speed to said first intermediate forward speed, and concurrently maintaining said first magnitude of angle of attack between about 2° and about 0°, and, increasing said forward speed from said first intermediate forward speed to said maximum forward speed, and concurrently increasing said first magnitude of angle of attack to more than about 5°.

16. The method according to claim 14, further comprising one of the following:
increasing said forward speed from said minimum forward speed to said first intermediate forward speed, and concurrently providing a negative value for said first magnitude of angle of attack, and, increasing said forward speed from said first intermediate forward speed to said maximum forward speed, and concurrently increasing said first magnitude of angle of attack to more than about 5°;
increasing said forward speed from said minimum forward speed to said first intermediate forward speed, and concurrently maintaining said first magnitude of angle of attack between about 2° and about 0°;

increasing said forward speed from said minimum forward speed to said first intermediate forward speed, and concurrently providing a negative value for said first magnitude of angle of attack;
increasing said forward speed from said minimum forward speed to a first intermediate forward speed less than said maximum forward speed, and concurrently maintaining said first magnitude of angle of attack at less than about 5°, and, increasing said forward speed from said first intermediate forward speed to said maximum forward speed, and concurrently increasing said first magnitude of angle of attack to more than about 5°;
increasing said forward speed from said minimum forward speed to said first intermediate forward speed, and concurrently maintaining said first magnitude of angle of attack between about 2° and about 0°, and, increasing said forward speed from said first intermediate forward speed to said maximum forward speed, and concurrently increasing said first magnitude of angle of attack to more than about 5°; or
increasing said forward speed from said minimum forward speed to said first intermediate forward speed, and concurrently providing a negative value for said first magnitude of angle of attack, and, increasing said forward speed from said first intermediate forward speed to said maximum forward speed, and concurrently increasing said first magnitude of angle of attack to more than about 5°.

17. The method according to claim 11, further comprising one of the following:
providing an operating map including said angle of attack associated with the high lift mild stall fixed wings with forward speed, conditions of separated flow over the fixed wings, and conditions of partially and/or fully attached flow over the fixed wings; and, using the operating map, causing the air vehicle to operate at least within an angle of attack range corresponding to the operating map, such as to minimize time required for transiting from said forward speed mode to said hover mode via said transition mode; or
providing an operating map including said angle of attack associated with the high lift mild stall fixed wings with forward speed, conditions of separated flow over the fixed wings, and conditions of partially and/or fully attached flow over the fixed wings; and, using the operating map, causing the air vehicle to operate at least within an angle of attack range corresponding to the operating map, such as to minimize time required for transiting from said forward speed mode to said hover mode via said transition mode, and, wherein said operating map is in electronic form in a memory or processor of a computer.

18. The method according to claim 17, wherein the operating map includes:
a first operating region in said operating map comprising a plurality of first points therein, each of said plurality of first points representing a respective first set of a respective said angle of attack and a respective said forward speed, said first operating region defining a first operating boundary comprising a first variation of a maximum forward speed limit with said angle of attack;
a second operating region in said operating map comprising a plurality of second points therein, each of said plurality of second points representing a respective second set of a respective said angle of attack and a respective said forward speed, said second operating region defining a second operating boundary comprising a second variation of a minimum forward speed limit with said angle of attack;

a third operating region in said operating map extending between said first operating boundary and said second operating boundary, said third operating region comprising a plurality of third points therein, each of said plurality of third points representing a respective third set of a respective said angle of attack and a respective said forward speed;

a fourth operating region in said operating map comprising a plurality of fourth points therein, each of said plurality of fourth points representing a respective fourth set of a respective said angle of attack and a respective said forward speed, said fourth operating region extending away from said second operating boundary;

wherein:

each of said plurality of first points in said first operating region corresponding to conditions fully separated flow over the fixed wings of the air vehicle or of zero flow over the fixed wings of the air vehicle, irrespective of whether or not the first point was reached from any one of said third points;

each of said plurality of second points in said second operating region corresponding to conditions of attached flow over the fixed wings irrespective of whether or not the respective said second point was reached from any one of said third points, wherein said conditions of attached flow over the wings are sufficient to generate aerodynamic lift, and wherein a magnitude of such aerodynamic lift is insufficient to maintain straight level flight for the air vehicle; and each of said plurality of third points in said third operating region corresponding to (i) conditions of attached flow or to (ii) conditions of separated flow or zero flow over the fixed wings, depending on whether the respective said third point was reached from any one of said plurality of second points or from any one of said plurality of first points, respectively;

each of said plurality of fourth points in said fourth operating region corresponding to conditions of attached flow over the fixed wings sufficient to generate aerodynamic lift having sufficient at least to maintain straight level flight for the air vehicle.

19. A VTOL-type fixed wing air vehicle, comprising a first propulsion system, a second propulsion system, a fixed wing arrangement, and a controller:

wherein the controller is configured for selectively causing the air vehicle to transition from a forward speed mode to a hover mode via a transition mode;

wherein:

said first propulsion system is configured for providing a first thrust to the air vehicle at a first thrust vector, the first thrust being sufficient for enabling powered aerodynamic flight to the air vehicle at least in said forward speed mode;

said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transition mode; and said fixed wing arrangement comprises high lift, mild stall wings; and wherein the controller is configured for selectively operating to cause the air vehicle to follow a transient path in said transition mode from said forward speed mode to said hover mode, wherein said transient path comprises manipulating a first magnitude of angle of attack of the air vehicle and a second magnitude of forward speed of the air vehicle during said transition mode to provide a corresponding aerodynamic lift component, and concurrently manipulating a third magnitude of said second thrust during said transition mode to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero, and wherein a stall plateau of the high lift, mild stall wings enables said step of manipulating the first magnitude of angle of attack of the air vehicle and the second magnitude of forward speed of the air vehicle to provide said first magnitude of angle of attack corresponding to a high angle of attack, thereby enabling the spatially fixed second thrust vector to provide an aft braking force during said transition mode.

20. The VTOL-type fixed wing air vehicle according to according to claim 19, wherein said second propulsion system comprises one or more propulsion units non-pivotably mounted with respect to the air vehicle.

21. A VTOL-type fixed wing air vehicle, comprising a first propulsion system, a second propulsion system, a fixed wing arrangement, and a controller:

wherein the controller is configured for selectively causing the air vehicle to transition between a forward speed mode and a hover mode via a transition mode;

wherein:

said first propulsion system is configured for providing a first thrust to the air vehicle at a first thrust vector, the first thrust being sufficient for enabling powered aerodynamic flight to the air vehicle at least in said forward speed mode;

said second propulsion system is configured for providing a second thrust to the air vehicle at a second thrust vector, the second thrust being at least sufficient for enabling vectored thrust flight to the air vehicle at least in said hover mode, wherein said second thrust vector is spatially fixed with respect to the air vehicle at a first fixed spatial position that is unchanged at least during said transition mode; and said fixed wing arrangement comprises high lift, mild stall wings; and wherein the controller is configured for selectively operating to cause the air vehicle to follow a transient path in said transition mode between said forward speed mode and said hover mode, wherein said transient path comprises manipulating a first magnitude of angle of attack of the air vehicle and a second magnitude of forward speed of the air vehicle during said transition mode to provide a corresponding aerodynamic lift component, and concurrently manipulating a third magnitude of said second thrust during said transition mode to provide a vertical vectored thrust component corresponding to said first magnitude of angle of attack, such that a summation of said aerodynamic lift component and said vertical vectored thrust component is sufficient for enabling the air vehicle to remain in controlled flight in said transition mode between conditions corresponding to said forward speed mode wherein said vertical vectored thrust component is zero, and conditions corresponding to said hover mode wherein said aerodynamic lift component is zero.

22. The VTOL-type fixed wing air vehicle according to according to claim 21, wherein said second propulsion system comprises one or more propulsion units non-pivotably mounted with respect to the air vehicle.

\* \* \* \* \*